United States Patent
Goto et al.

(10) Patent No.: US 10,198,870 B2
(45) Date of Patent: Feb. 5, 2019

(54) INFORMATION PROCESSING APPARATUS, INFORMATION PROCESSING SYSTEM, AND INFORMATION PROCESSING METHOD

(71) Applicant: SONY CORPORATION, Tokyo (JP)

(72) Inventors: Tetsuro Goto, Tokyo (JP); Masatoshi Ueno, Kanagawa (JP); Kenichi Kabasawa, Saitama (JP); Toshiyuki Nakagawa, Kanagawa (JP); Daisuke Kawakami, Kanagawa (JP); Shinobu Kuriya, Kanagawa (JP); Tsubasa Tsukahara, Tokyo (JP); Hisako Sugano, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/794,326

(22) Filed: Oct. 26, 2017

(65) Prior Publication Data

US 2018/0096536 A1    Apr. 5, 2018

Related U.S. Application Data

(63) Continuation of application No. 14/385,869, filed as application No. PCT/JP2013/000953 on Feb. 20, 2013, now Pat. No. 9,824,497.

(30) Foreign Application Priority Data

Mar. 29, 2012  (JP) .................................. 2012-076966

(51) Int. Cl.
  *G06T 19/00*  (2011.01)
  *G06T 7/00*   (2017.01)
  (Continued)

(52) U.S. Cl.
  CPC .............. *G06T 19/006* (2013.01); *G06T 7/00* (2013.01); *G06T 7/74* (2017.01); *G02B 27/017* (2013.01);
  (Continued)

(58) Field of Classification Search
  None
  See application file for complete search history.

(56) References Cited

U.S. PATENT DOCUMENTS

2002/0172415 A1  11/2002  Asano et al.
2006/0004280 A1   1/2006  Kotake et al.
(Continued)

FOREIGN PATENT DOCUMENTS

CN   1802586 A    7/2006
EP   1650704 A1   4/2006
(Continued)

OTHER PUBLICATIONS

Wagner, et al., "Robust and unobtrusive marker tracking on mobile phones", Mixed and augmented Reality, 2008. ISMAR 2008. 7th IEEE/ACM International Symposium on, IEEE, Sep. 15, 2008, pp. 121-124.

(Continued)

*Primary Examiner* — Jwalant Amin
(74) *Attorney, Agent, or Firm* — Chip Law Group

(57) ABSTRACT

The present disclosure is generally directed to an information processing apparatus, comprising: a processor configured to: detect a real object on a real space; receive first superimposition information that corresponds to superimposition of a virtual object on the real object, wherein the first superimposition information is generated based on a spatial position relationship of a second information processing apparatus and the real object; generate second superimposition information based on spatial positional
(Continued)

information of the first information processing apparatus and the received first superimposition information; and display the virtual object based on the generated second superimposition information.

16 Claims, 29 Drawing Sheets

(51) Int. Cl.
　　*G06T 7/73*　　　(2017.01)
　　*G02B 27/01*　　(2006.01)
　　*G06T 7/11*　　　(2017.01)
　　*G06F 3/01*　　　(2006.01)
　　*G06F 3/0346*　　(2013.01)

(52) U.S. Cl.
　　CPC .... *G02B 27/0172* (2013.01); *G02B 2027/014* (2013.01); *G02B 2027/0138* (2013.01); *G06F 3/011* (2013.01); *G06F 3/0346* (2013.01); *G06F 2203/04806* (2013.01); *G06T 7/11* (2017.01); *G06T 2207/10016* (2013.01); *G06T 2207/10021* (2013.01); *G06T 2207/30204* (2013.01); *G06T 2207/30208* (2013.01); *G06T 2219/024* (2013.01)

(56) References Cited

U.S. PATENT DOCUMENTS

| 2008/0030461 | A1 | 2/2008 | Matsui et al. |
| 2010/0107081 | A1 | 4/2010 | Benenson |
| 2011/0216002 | A1 | 9/2011 | Weising et al. |

FOREIGN PATENT DOCUMENTS

| JP | 2001-126051 A | 5/2001 |
| JP | 2002-324239 A | 11/2002 |
| JP | 2004-062758 A | 2/2004 |
| JP | 2006-099188 A | 4/2006 |
| JP | 2007-075213 A | 3/2007 |
| JP | 2007-272623 A | 10/2007 |
| JP | 2008-040556 A | 2/2008 |
| JP | 2009-225432 A | 10/2009 |
| JP | 2010-231459 A | 10/2010 |
| WO | 2011/109126 A1 | 9/2011 |
| WO | 2011/129907 A1 | 10/2011 |

OTHER PUBLICATIONS

Roy, et al., "PoCoMo: Projected Collaboration using Mobile Devices", MOBILEHCI 2011, Aug. 30-Sep. 2, 2011, Stockholm, Sweden, Aug. 30, 2011, pp. 333-336.
Karl, et al., "SideBySide", A User Interface Software and Technology, ACM, 2 Penn Plaza, Suite 701, Oct. 16, 2011, pp. 431-440.
Newman, et al., "Ubiquitous Tracking for Augmented Reality", Mixed and augmented reality, 2004, ISMAR, 2004, Third IEEE and ACM International Symposium on arlington, Nov. 2-5, 2004, Nov. 2, 2004, pp. 192-201.
International Search Report and Written Opinion of PCT Application No. PCT/JP2013/000953, dated Jun. 17, 2013, 11 pages.
Hosoi, et al., "VisiCon: A Robot Control Interface for Visualizing Manipulation Using a Handheld Projector", Cooperative Robot Navigation Game via Projection, 2007, pp. 99-106.
Santos, et al., "LIS3D: Low-Cost 6DOF Laser Interaction for Outdoor Mixed Reality", Virtual and Mixed Reality, HCII, Part I, 2011, pp. 270-279.
Office Action for Japanese Patent Application No. 2012-076966, dated Mar. 15, 2016, 5 pages.
Office Action for Chinese Patent Application No. 201380015874.8, dated Mar. 18, 2016, 21 pages Office Action and 9 pages of English Translation.
Office Action for Chinese Patent Application No. 201380015874.8, dated Sep. 18, 2016, 14 pages Office Action and 8 pages of English Translation.
Office Action for U.S. Appl. No. 14/385,869, dated Jan. 25, 2017, 15 pages Office Action.
Office Action for U.S. Appl. No. 14/385,869, dated Jun. 30, 2016, 12 pages Office Action.
Notice of Allowance for U.S. Appl. No. 14/385,869, dated Jul. 18, 2017, 5 pages Office Action.
International Preliminary Report on Patentability of PCT Application No. PCT/JP2013/000953, dated Oct. 1, 2014, 6 pages.

INFORMATION PROCESSING APPARATUS, INFORMATION PROCESSING SYSTEM, AND INFORMATION PROCESSING METHOD

CROSS-REFERENCE TO RELATED APPLICATION

The present application is a continuation application of U.S. patent application Ser. No. 14/385,869, filed Sep. 17, 2014, which is a National Stage of PCT/JP2013/000953, filed Feb. 20, 2013, and claims the benefit of priority from prior Japanese Patent Application JP 2012-076966, filed Mar. 29, 2012, the entire content of which is hereby incorporated by reference.

TECHNICAL FIELD

The present technology relates to an information processing apparatus, an information processing system, and an information processing method with which images are displayed by superimposition thereof with respect to the real space.

BACKGROUND ART

There is a technology called augmented reality (AR), with which an image of the real space is added with an image corresponding to the real space. With the AR, a camera or others are used to obtain an image of the real space, and with respect to the obtained image of the real space, virtual information (hereinafter, virtual information) is superimposed for display. By viewing the displayed virtual information superimposed with respect to the real space, a user recognizes an object displayed as the virtual information as if it exists in the real space.

The AR includes marker AR and marker-less AR. With the marker AR, image information is registered in advance about a marker physically disposed in the real space (for example, a colored square of a predetermined size). An image of the real space (real image) is obtained by imaging of the real space, a marker is detected from this real image, and using information about the size and angle of the detected marker, for example, the spatial position relationship of an imaging apparatus with respect to the marker is calculated. Based on this spatial position relationship of the imaging apparatus with respect to the marker, the display position and the display angle of the virtual information are calculated. Based on the calculated display position and display angle, the virtual information is displayed on a display apparatus whose position is fixed relative to the imaging apparatus so that the user can perceive the virtual information together with the real space (for example, see Patent Literature 1.).

On the other hand, with the marker-less AR, no specific marker is used. Any object in a real image and the real space itself are spatially recognized, and based on information about the size, the angle, and others of the object, for example, the spatial position relationship of the imaging apparatus with respect to the object is calculated. Based on the position relationship, the display position and the display angle of the virtual information are calculated, and the virtual information is displayed on a display apparatus whose position is fixed relative to the imaging apparatus so that the user can perceive the virtual information together with the real space.

CITATION LIST

Patent Literature

[PTL 1]
Japanese Patent Application Laid-open No. 2007-75213
[PTL 2]
Japanese Patent Application Laid-open No. 2008-40556
[PTL 3]
Japanese Patent Application Laid-open No. 2007-272623
[PTL 4]
Japanese Patent Application Laid-open No. 2002-324239

SUMMARY

Technical Problem

With the marker AR, a marker existing in the real space is used as a basis to calculate the display position and the display angle of virtual information. Therefore, there are advantages of being able to calculate these relatively easily. On the other hand, there are disadvantages including time and effort to create the marker, provision of the placement space for the marker, degradation of the marker with time, physical and psychological stress by the marker existing in the real space, design restrictions on the marker, and others.

On the other hand, the marker-less AR has advantages of not needing creation and placement of the marker, and of being applicable to a place where the marker is not supposed to be disposed. On the other hand, there are disadvantages of complicating the calculation due to the construction of a space model in a wide region and therearound for display of the virtual information, needing the high computing power, resulting in difficulty in ensuring the stability and the high precision if the computing power is not enough, and causing a possible delay, for example.

Moreover, there are problems common to the marker AR and the marker-less AR as below.

User's difficulty in freely operating the virtual information (position moving, zooming, and rotating, for example). That is, there needs to temporarily stop the use to change the position of the existing marker (with the marker AR), and to change the display position of the virtual information on a program.

Due to the use of image recognition with a visible-light camera, no possible image recognition in a place too bright or in a place too dark. In addition, a problem is also caused if a shield against a light source (the Sun, electric light, and others) produces intense shades (contrast) on the surface of an existing object.

As described above, the marker AR and the marker-less AR each have advantages and disadvantages, and are susceptible to improvement for the practical use.

In consideration of the circumstances as described above, it is desirable to display virtual information with stability and high precision.

Solution to Problem

An example embodiment of the present disclosure is directed to an information processing apparatus comprising: at least one processor configured to execute instructions to: generate a superimposition parameter corresponding to superimposing virtual information on a real space based on a spatial position of a marker projected on the real space by an input apparatus, and cause a display section to display the virtual information superimposed on the real space according to the spatial position relationship while the marker is detectable and continue the display of the virtual information superimposed on the real space after the marker is undetectable according to a last detected spatial position of the marker.

Another example embodiment of the present disclosure is directed to an information processing apparatus comprising: a receiver; and at least one processor configured to execute instructions to: receive a superimposition parameter corresponding to superimposing virtual information on a real space based on a spatial position of a marker projected on the real space by an input apparatus, and cause a display section to display the virtual information superimposed on the real space according to the spatial position relationship while the marker is detectable and continue the display of the virtual information superimposed on the real space after the marker is undetectable according to a last detected spatial position of the marker.

Another example embodiment of the present disclosure is directed to a system comprising: a first information processing apparatus, comprising: a first processor configured to execute instructions to generate a superimposition parameter corresponding to superimposing virtual information on a real space based on a spatial position of a marker projected on the real space by an input apparatus; and a second information processing apparatus, comprising: a second processor configured to execute instructions to cause a display section to display the virtual information superimposed on the real space according to the spatial position relationship while the marker is detectable and continue the display of the virtual information superimposed on the real space after the marker is undetectable according to a last detected spatial position of the marker.

Advantageous Effect of Invention

As described above, according to the present technology, the virtual information can be displayed with stability and high precision.

DESCRIPTION OF EMBODIMENTS

Figure 1:
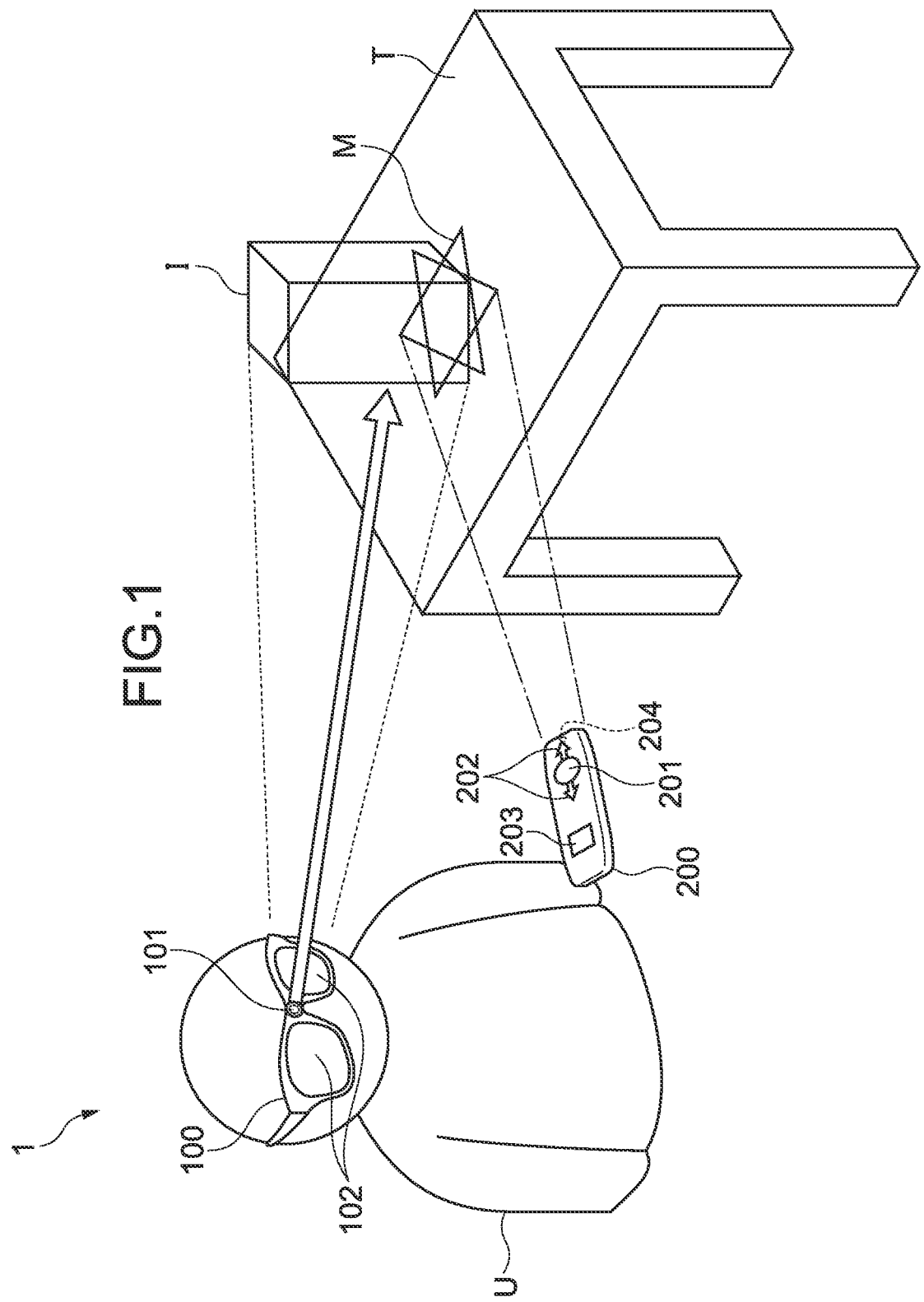
FIG. 1 is a schematic diagram showing an information processing system according to a first embodiment of the present technology.

In the below, embodiments according to the present technology are described by referring to the drawings.

First Embodiment

[Overview of First Embodiment]

FIG. 1 is a schematic diagram showing an information processing system 1 according to a first embodiment of the present technology.

The information processing system 1 in this embodiment includes a head-mounted display (HMD) 100 (information processing apparatus), and an input apparatus 200 (projection apparatus).

The HMD 100 is in the shape of glasses in its entirety, and is wearable on the head portion of a user U. The HMD 100 includes a display section 102 to be located in front of eyes of the user U when it is worn, and an imaging section 101 that can image at least the field of view range of the user U in the real space. The display section 102 has the transparency, and the user U is allowed to perceive the real space through the display section 102, and at the same time, images can be displayed by being superimposed in the real space where the user U perceives. The HMD 100 detects a marker M, which is included in an image in the real space (real image) captured by the imaging section 101 and is projected by the input apparatus 200. Based on the detected marker M, a superimposition parameter of virtual information I is calculated. This "superimposition parameter" is a parameter related to the format of the virtual information to be displayed by superimposition with respect to the real space, and specifically, is the position, the angle, and the size of the virtual information I. The HMD 100 generates predetermined virtual information based on the calculated superimposition parameter, and by the display section 102, the virtual information I is displayed with superimposition on the marker M projected into the real space where the user U perceives. A selection of contents to be displayed as this virtual information I is input by the user in advance using an input section (FIG. 3) provided to the HMD 100.

The input apparatus 200 has such size and shape as to be held by the hand(s) of the user U. The input apparatus 200 is provided with a projection button 201, a zoom slider 202, and a power button 203. When the user U depresses the projection button 201, from a projection window 204, a graphic form in the predetermined shape is projected as the marker M toward a projection target T (desk, for example) in the real space. The projection position of this marker M is the display position of the virtual information I by the HMD 100. Moreover, by the user U moving the input apparatus 200 while depressing the projection button 201, the virtual information I can be operated. When the projection position of the marker M is moved by the user U moving the input apparatus 200 while depressing the projection button 201, for example, the virtual information I can be moved (dragged). Similarly, when the user U rotates the marker M by rotating the input apparatus 200 while depressing the projection button 201, the virtual information I can be rotated. Moreover, when the user U operates the zoom slider 202 while depressing the projection button 201, the virtual information I can be zoomed in/out (zoomed). In order to display any other new virtual information during the display of the virtual information I, the user U stops depressing the projection button 201, and inputs a selection of contents for display as the new virtual information using the input section (FIG. 3) provided to the HMD 100. Moreover, when the user U stops depressing the projection button 201, and thereafter, when the user depresses the projection button 201 again to superimpose the marker M on the virtual information I being displayed, the virtual information I becomes available again for operation.

Note that the information processing system 1 may include a plurality of HMDs respectively worn by a plurality of users.

Figure 2:
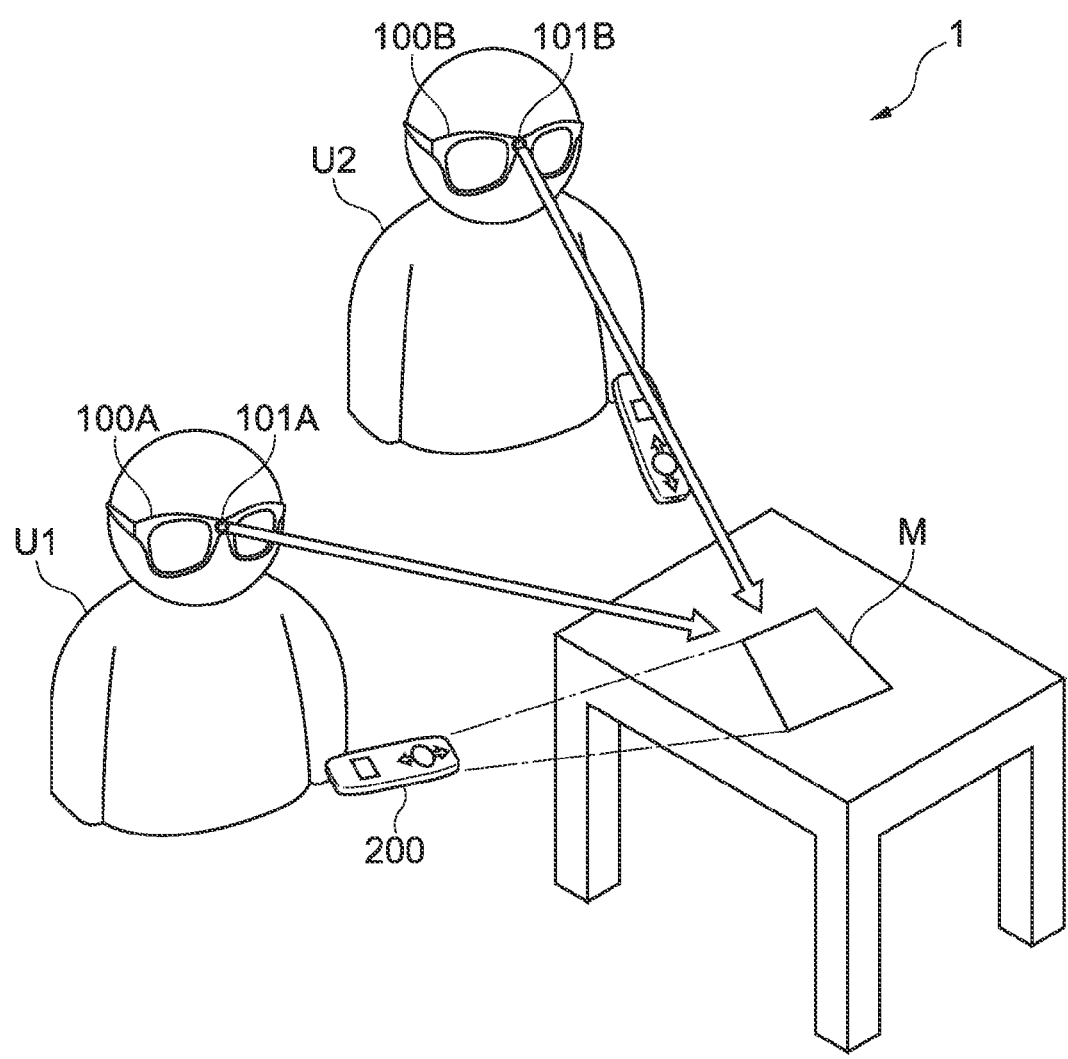
FIG. 2 is a schematic diagram showing the information processing system including a plurality of head-mounted displays (HMDs).

FIG. 2 is a schematic diagram showing the information processing system 1 including a plurality of HMDs 100A and 100B.

The plurality of HMDs 100A and 100B are worn by a plurality of users U1 and U2, respectively. The user U1 projects the marker M into the real space using the input apparatus 200. From the real image captured by an imaging section 101A of the HMD 100A, the HMD 100A detects the marker M projected by the input apparatus 200 held by the user U1 wearing the HMD 100A, and displays the virtual information based on the detected marker M. From the real image captured by an imaging section 101B of the HMD 100B, the HMD 100B detects the marker M projected by the input apparatus 200 held by the user U1 different from the user U2 wearing the HMD 100B, and displays the virtual information based on the detected marker M.

[Hardware Configuration of HMD]

Figure 3:
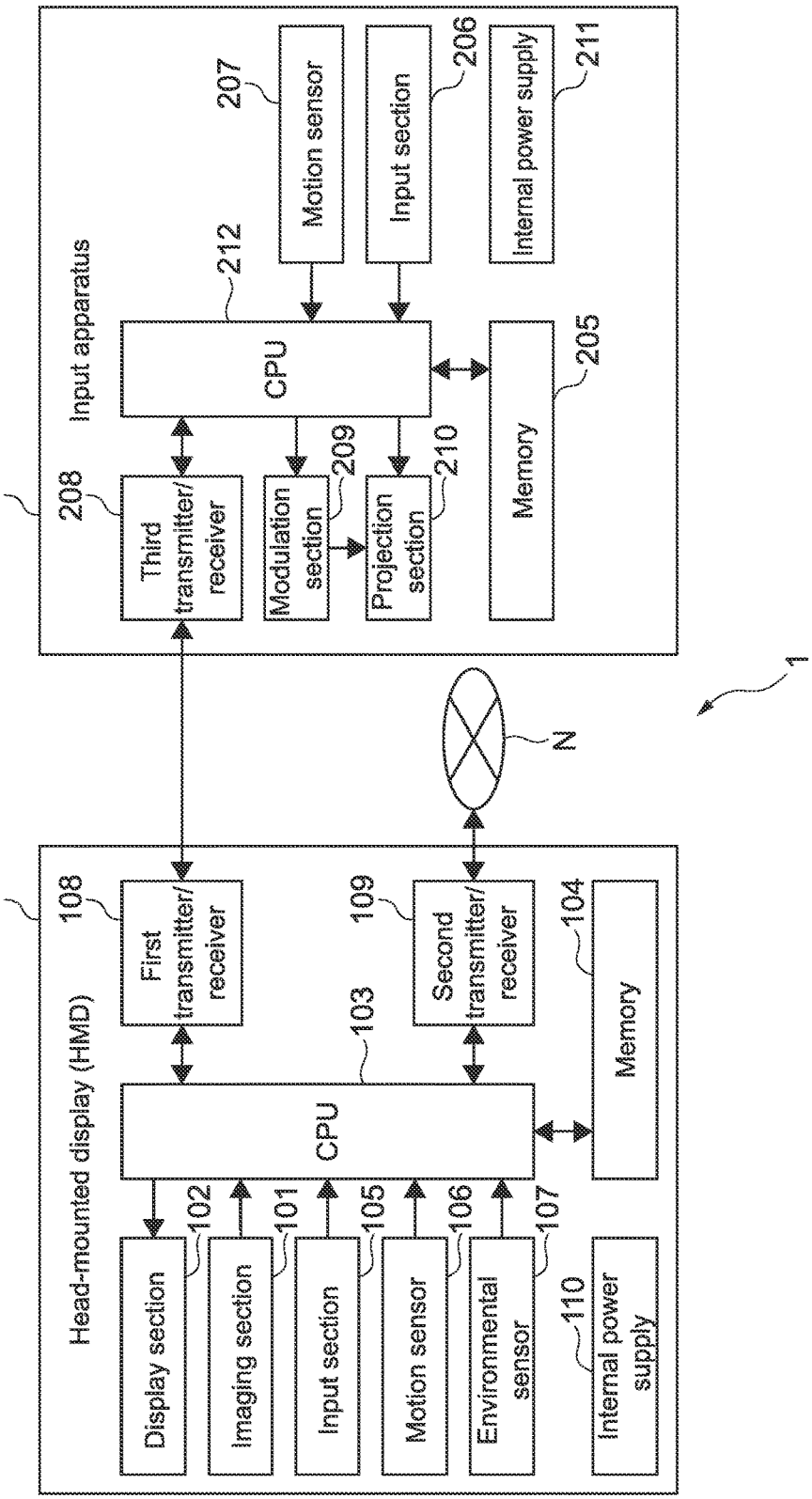
FIG. 3 is a block diagram showing the hardware configuration of the HMD and that of an input apparatus.

FIG. 3 is a block diagram showing the hardware configuration of the HMD 100 and that of the input apparatus 200.

The HMD 100 includes a CPU (Central Processing Unit) 103, a memory 104, the imaging section 101, the display section 102, an input section 105, a motion sensor 106, an environmental sensor 107, a first transmitter/receiver 108, a second transmitter/receiver 109, and an internal power supply 110. The memory 104, the imaging section 101, the display section 102, the input section 105, the motion sensor 106, the environmental sensor 107, the first transmitter/receiver 108, and the second transmitter/receiver 109 are each connected to the CPU 103.

The CPU 103 executes various types of processes by following a program stored in the memory 104.

The imaging section 101 is capable of imaging at least the user's field of view range in the real space. The imaging section 101 is configured by an imaging element such as a CMOS (Complementary Metal Oxide Semiconductor) image sensor, and an A/D (Analog/Digital) converter that subjects an output of the imaging element to A/D conversion, for example.

The display section 102 is configured by an LCD (liquid crystal display element), and an optical system, for example, and presents images formed by the LCD to the user via the optical system. More specifically, the display section 102 is capable of displaying the LCD-formed images with superimposition on the user's field of view while allowing the user to perceive the outside world.

The input section 105 is configured by a button, a slider, a switch, a dial, a touch sensor, and others and is capable of inputting, by the user operation, a command to the CPU 103, and a selection of contents for display as the virtual information. The motion sensor 106 is an acceleration sensor, a gyro sensor, and a magnetic sensor, for example, and is capable of detecting the movement of the HMD 100.

The environmental sensor 107 is capable of detecting the illuminance, and the temperature/humidity, for example.

The first transmitter/receiver 108 is a middle/high-speed short-range wireless transmitter/receiver such as Bluetooth (trade mark) and Wi-Fi (trade mark), and performs information exchange with the input apparatus 200.

The second transmitter/receiver 109 is a middle-range wireless transmitter/receiver such as 3G (3rd Generation) and WiMAX (Worldwide Interoperability for Microwave Access, trade mark), and downloads contents to be displayed as the virtual information through connection to a network N such as the Internet and LAN (Local Area Network).

[Hardware Configuration of Input Apparatus]

With reference to FIG. 3, the input apparatus 200 includes a CPU 212, a memory 205, an input section 206, a motion sensor 207, a third transmitter/receiver 208, a modulation section 209, a projection section 210, and an internal power supply 211. The memory 205, the input section 206, the motion sensor 207, the third transmitter/receiver 208, the modulation section 209, and the projection section 210 are each connected to the CPU 212.

The CPU 212 executes various types of processes by following a program stored in the memory 205. Note that, as an alternative to the CPU, an MPU (Micro Processing Unit) may be used.

The input section 206 is configured by a button, a slider, a switch, a dial, a touch sensor, and others such as the projection button 201, the zoom slider 202, and the power button 203, and is capable of inputting a command to the CPU 212 by the user operation.

The motion sensor 207 is an acceleration sensor, a gyro sensor, and a magnetic sensor, for example, and is capable of detecting the movement of the input apparatus 200.

The third transmitter/receiver 208 is a middle/high-speed short-range wireless transmitter/receiver such as Bluetooth (trade mark) and Wi-Fi (trade mark), and performs information exchange with the HMD 100.

The modification section 209 modulates digital data handled by the CPU 212 into an optical signal, which can be projected by the projection section 210.

The projection section 210 is configured by a laser pointer or a laser projector, which is capable of projecting a graphic form in the predetermined shape as the marker from the projection window 204 (FIG. 1) toward a projection target (wall, desk, and others) in the real space. Used as the laser pointer is of a point-display type (red, green, blue), a beam-variable type (scanner type, lens type, hologram type), an ultraviolet type, an infrared type, or others. Used as the laser projector is an apparatus that is equipped with a MEMS (Micro Electro Mechanical System) scanner and is capable of image projection by scanning sequentially from the top by a line of laser light moving in the lateral direction at a high speed, for example.

[Process to be Performed by HMD]

The HMD 100 is capable of executing three processes below.

1. Process of displaying virtual information with respect to a marker included in real image data obtained by imaging, and a process of displaying the virtual information without causing a user to feel uncomfortable when a computing/update process on a superimposition parameter of the virtual information is stopped due to disappearance of the marker, or due to no more existence of the marker in the real image data as a result of the user operation, and when the imaging section is moved thereafter (first process).

2. Process of displaying the virtual information by each of the HMDs with the angle, the position, the size, and others like when a plurality of users are viewing the same object via their HMDs (second process).

3. Process of displaying the virtual information in the state with which the user is less likely to feel uncomfortable when there is a possibility of causing the user to feel uncomfortable if the virtual information is displayed based on the marker, for example (third process).

<First Process>

[Overview of First Process]

In order to solve each of the above-described problems of the marker AR and the marker-less AR, there is an approach proposed to enjoy the advantages of the marker AR without the use of a physical marker by projecting a marker using a fixed laser projector, for example. However, this approach has the following problems.

Being specific about the placement position because of necessity to prepare additional equipment such as a projector and a fixed point camera.

Being poor in real-time performance because of necessity to prove a step of performing detailed space scanning before use.

Complicating calculation because of necessity to construct a space model in a wide region.

On the other hand, proposed is an approach to solve the above-described problem about the placement position by a user projecting a marker with a portable laser pointer in hand (Patent Literature 2, and Patent Literature 3).

According to Patent Literature 2, the imaging apparatus and the portable laser pointer each detect its position and posture in the space. With a matching between a pointing point of the laser pointer in the image captured by the imaging apparatus, and a virtual pointing point estimated from the spatial position of the laser pointer and that of the imaging apparatus, the superimposition position of the virtual information is calculated. However, this approach has the following problems.

Complicating measurement and calculation of the space because of necessity to construct a space model in a wide region.

Complicating calculation, and difficulty in ensuring stability and good precision because of necessity to compute also the posture of the laser pointer and that of the imaging apparatus.

According to Patent Literature 3, a pointing point is projected at least toward three portions of a projection target (wall, for example) using a portable laser pointer. Based on these pointing points, computed are the distance between the laser pointer and the projection target, the direction, and the display coordinates. However, this approach has the following problems.

In the form of integrally configuring the laser pointer and the projection apparatus (FIGS. 1 and 19 of Patent Literature 3), for displaying the virtual information with no motion at a specific position, causing fatigue to the user because of necessity to keep the laser pointer always in the same posture. Moreover, causing a difficulty in stabilizing the position of the virtual information on display due to hand shake.

Necessary to continuously project the pointing points during display of the virtual information because if the projection of the pointing points is stopped, the display position of the virtual information is not calculated. Moreover, not being able to operate individually a plurality pieces of virtual information.

In order to deal with these problems, it is hypothesized that a processing manner is to continuously display the virtual information at the position displayed last when the projection of the pointing points is stopped. However, if the imaging section (the user carrying the imaging section) moves or rotates even slightly in that case, the position, the angle, and others of the virtual information are not correct for the user any more because the position, the angle, and others of the virtual information do not change.

In consideration of the circumstances as above, in the first process according to this embodiment of the present technology, the virtual information is displayed without causing the user to feel uncomfortable even if the computing/update process on the superimposition parameter of the virtual information is stopped due to disappearance of the marker, or due to no more existence of the marker in the real image data as a result of the user operation, and even if the imaging section is moved thereafter. To be more specific, the display is continued with the retained relative position between the real space and the superimposed virtual information immediately before the computing is stopped (at the time point when the marker is detected last).

[Functional Configuration of HMD for Execution of First Process]

Figure 4:
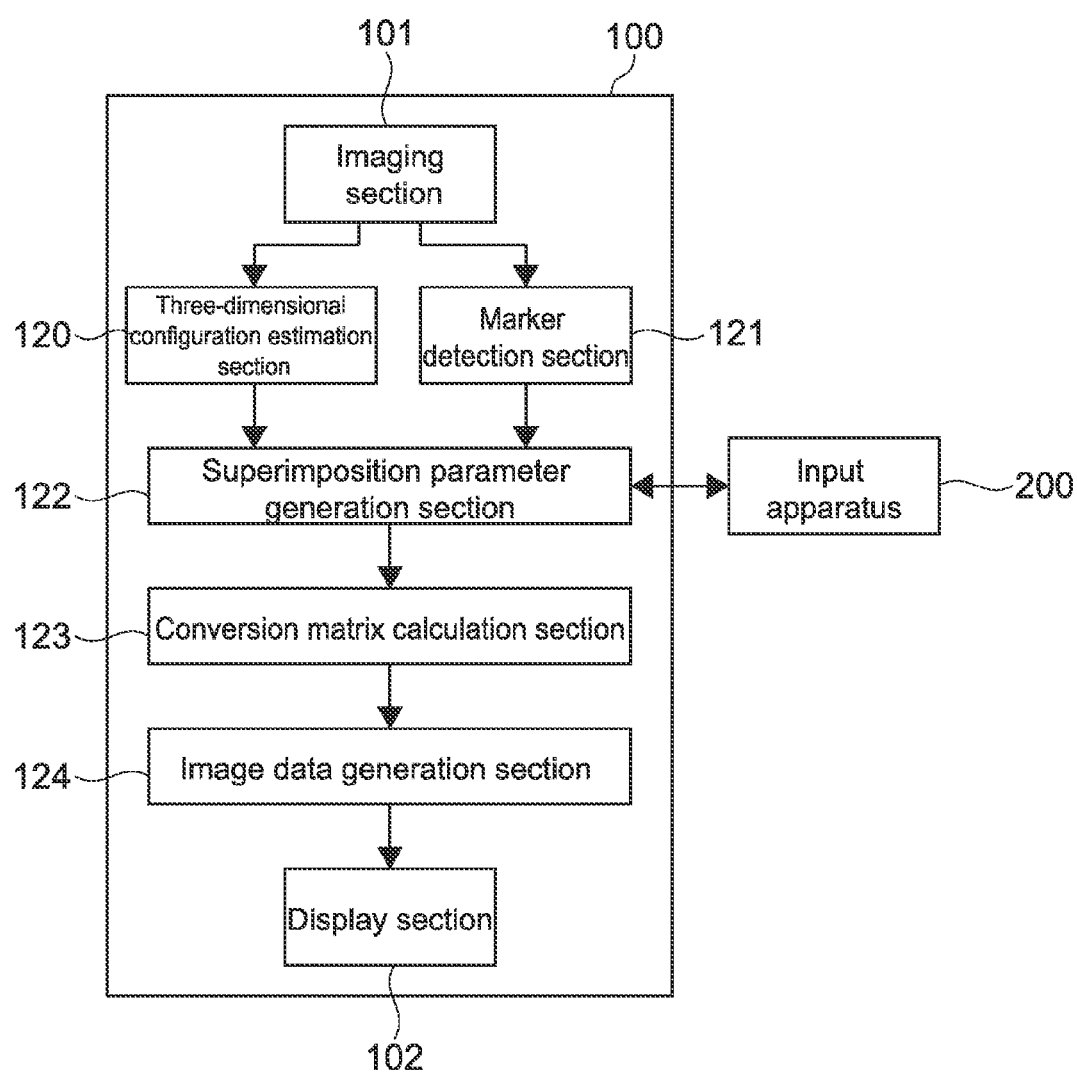
FIG. 4 is a block diagram showing the functional configuration of the HMD for execution of a first process.

FIG. 4 is a block diagram showing the functional configuration of the HMD 100 for execution of the first process.

The HMD 100 includes the imaging section 101, a three-dimensional configuration estimation section 120, a marker detection section 121, a superimposition parameter generation section 122, a conversion matrix calculation section 123, an image data generation section 124, and the display section 102.

The imaging section 101 captures images of the real space, and obtains real image data. The imaging section 101 supplies the obtained real image data to the three-dimensional configuration estimation section 120 and to the marker detection section 121.

The three-dimensional configuration estimation section 120 estimates the three-dimensional configuration of the real space using the so-called scene mapping (mobile stereo) technology. That is, the three-dimensional configuration estimation section 120 (characteristic point detection section) detects a plurality of characteristic points (corner points) from the real image data provided by the imaging section 101. During the field-of-view movement of the imaging section 101, the three-dimensional configuration estimation section 120 continuously detects the characteristic points in real time (continuously keeps track of (performs tracking) the characteristic points).

With the general three-dimensional configuration estimation technology, using two cameras (stereo cameras), right and left stereo video are obtained. On the other hand, the three-dimensional configuration estimation section 120 in this embodiment calculates the stereo video by time-division imaging using a piece of moving camera (the imaging section 101) by chronologically establishing a link by the tracking of the characteristic points.

From this stereo video, the three-dimensional configuration estimation section 120 estimates the three-dimensional configuration of the real space, and supplies the estimation result to the superimposition parameter generation section 122.

By referring back to FIG. 4, from the real image data obtained by the imaging section 101, the marker detection section 120 (graphic form detection section) detects a marker (graphic form) projected by the input apparatus 200. The marker detection section 121 is registered in advance with information about a reference marker. This "reference marker" is a marker in the reference shape predetermined in advance for a case where a marker is projected in the vertical direction with a predetermined distance away therefrom. The "information about the reference marker" is about the size of the reference marker, the distance between vertexes, the length of each side, and others. Based on the size of the reference marker, the marker detection section 121 generates a plane coordinate conversion matrix with which the marker detected from the real image data shows a matching with the shape of the reference marker, and performs coordinate conversion on the detected marker using the plane coordinate conversion matrix. Thereafter, the marker detection section 121 performs pattern matching on the coordinate-converted marker with the reference marker, thereby determining a degree of matching between the detected marker and the reference marker. The marker detection section 121 supplies the determination result to the superimposition parameter generation section 122.

Figure 6:
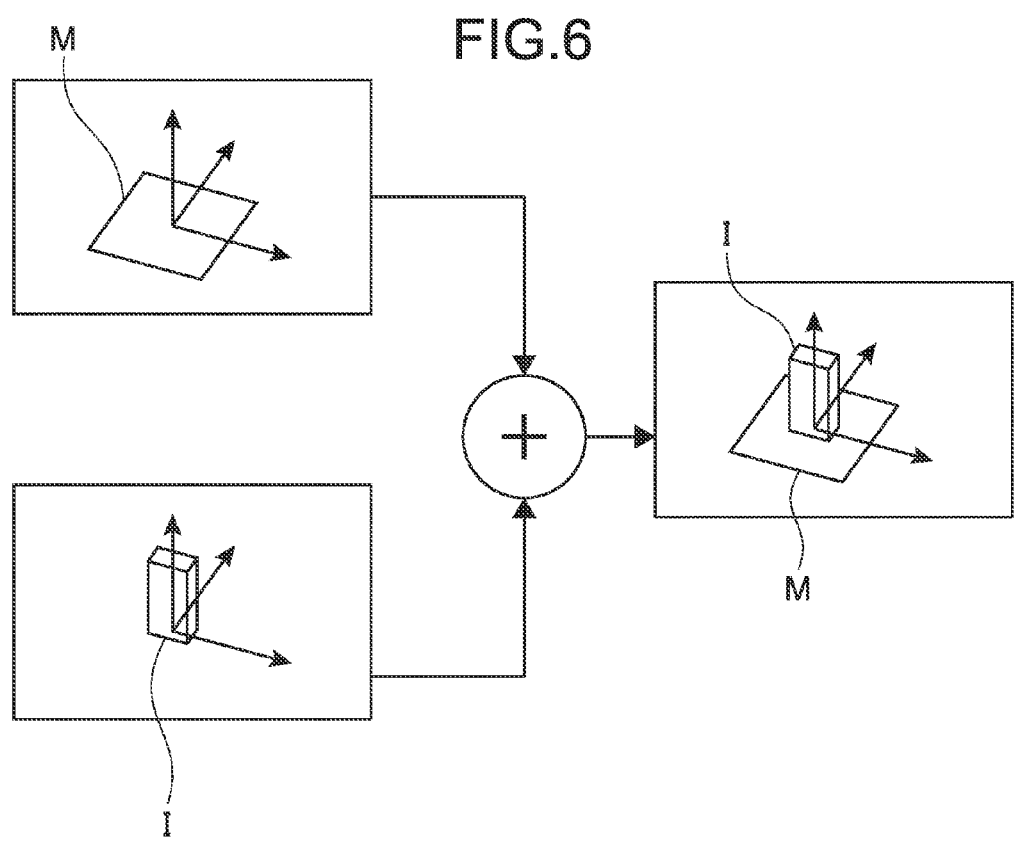
FIG. 6 is a diagram schematically showing the principles to generate a superimposition parameter by a superimposition parameter generation section.

As to the marker showing a predetermined degree of matching, based on distortion of the marker compared with the reference marker, the superimposition parameter generation section 122 calculates the spatial position relationship of the imaging section 101 with respect to the marker projected on the projection target (wall, desk, and others), that is, the angle and the distance. Moreover, as shown in FIG. 6, the superimposition parameter generation section 122 calculates a coordinate system of the marker M by contour extraction, which is shown in the upper left part of FIG. 6. Based on the above-described spatial position relationship of the imaging section 101 with respect to the marker, the superimposition parameter generation section 122 calculates the superimposition parameter of the virtual information so as to have a coordinate system, shown in the right part of FIG. 6, with a matching between the coordinate system of the marker M, which is shown in the upper left part of FIG. 6, and a coordinate system of the virtual information I that has been set in advance, which is shown in the lower left part of FIG. 6. As such, the superimposition parameter generated based on the spatial position relationship (first position relationship) of the imaging section 101 with respect to the marker is hereinafter referred to as "first superimposition parameter". Based on the relationship between the position of the HMD 100 detected by the motion sensor 106 and the position of the input apparatus 200 detected by the motion sensor 106 of the input apparatus 200, the superimposition parameter generation section 122 corrects the first superimposition parameter such that the virtual information is displayed more naturally for the user. Further, the superimposition parameter generation section 122 corrects the first superimposition parameter based on the position relationship between the user's eyes and the display section 102.

Still further, the superimposition parameter generation section 122 calculates the superimposition parameter of the virtual information by retaining the spatial position relationship (second position relationship) of the virtual information with respect to the real space so as to have a matching between the coordinate system of the three-dimensional configuration of the real space estimated by the three-dimensional configuration estimation section 120, and the coordinate system of the virtual information on display. The superimposition parameter generated to have a matching between the coordinate system of the three-dimensional configuration of the real space and the coordinate system of the virtual information on display as described above is hereinafter referred to as "second superimposition parameter". Note that, when there is no need to distinguish between the first and second superimposition parameters, it is referred simply to as "superimposition parameter".

The conversion matrix calculation section 123 generates a spatial coordinate conversion matrix for converting the coordinate system with reference to the marker into the coordinate system with reference to the imaging section 101 in the real space using the first superimposition parameter. The image data generation section 124 subjects object data of the virtual information recorded in advance to coordinate conversion using the spatial coordinate conversion matrix supplied by the conversion matrix calculation section 123. In this manner, the image data generation section 124 calculates (renders) the object image data of the virtual information in the coordinate system with reference to the imaging section 101.

Moreover, the conversion matrix calculation section 123 generates a spatial coordinate conversion matrix for converting the coordinate system of the virtual information on display into the coordinate system of the three-dimensional configuration of the real space using the second superimposition parameter. The image data generation section 124 subjects the object data of the virtual information to coordinate conversion using the spatial coordinate conversion matrix supplied by the conversion matrix calculation section 123.

The image data generation section 124 supplies the generated object image data of the virtual information to the display section 102.

The display section 102 displays the object image data of the virtual information supplied by the conversion matrix calculation section 123.

[Operation in First Process by HMD]

Figure 7:
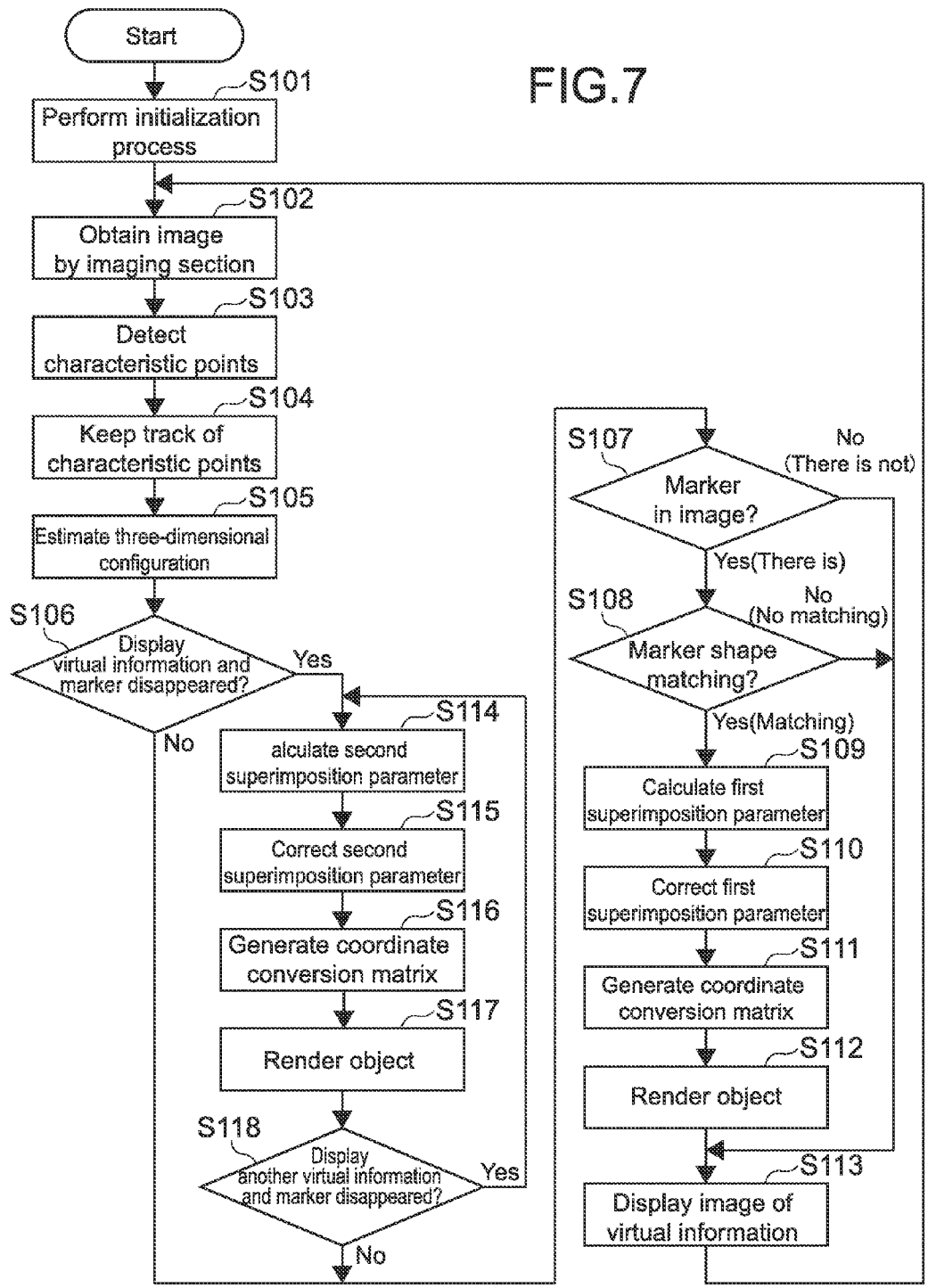
FIG. 7 is a flowchart showing the operation in the first process by the HMD.

FIG. 7 is a flowchart showing the operation in the first process by the HMD 100.

When the CPU 103 performs a predetermined initialization process (step S101), the imaging section 101 captures an image of the real space, and obtains real image data (step S102). The imaging section 101 supplies the obtained real image data to the three-dimensional configuration estimation section 120 and to the marker detection section 121. The three-dimensional configuration estimation section 120 detects a plurality of characteristic points from the real image data (step S103). Also during the field-of-view movement of the imaging section 101, the three-dimensional configuration estimation section 120 continuously detects the characteristic points in real time (continuously keeps track of (performs tracking) the characteristic points) (step S104). The three-dimensional configuration estimation section 120 calculates stereo video by time-division imaging using a piece of moving camera (the imaging section 101) by chronologically establishing a link by the tracking of the characteristic points. From this stereo video, the three-dimensional configuration estimation section 120 estimates the three-dimensional configuration of the real space, and supplies the estimation result to the superimposition parameter generation section 122 (Step S105).

Described is a case when the display section 102 for the virtual information does not display the virtual information yet, or when it already displays the virtual information and when the virtual information is displayed with superimposition on the real space (No in step S106). In this case, from the real image data obtained by the imaging section 101 (step S102), the marker detection section 121 detects the marker projected by the input apparatus 200 (Yes in step S107). Based on the size of the reference marker, the marker detection section 121 generates a plane coordinate conversion matrix with which the marker detected from the real image data shows a matching with the shape of the reference marker, and performs coordinate conversion on the detected marker using the plane coordinate conversion matrix. Thereafter, the marker detection section 121 performs pattern matching with the reference marker on the coordinate-converted marker, thereby determining a degree of matching between the detected marker and the reference marker (step S108). The marker detection section 121 supplies the determination result to the superimposition parameter generation section 122.

As to the marker showing a predetermined degree of matching (Yes in step S108), based on the distortion of the marker compared with the reference marker, the superimposition parameter generation section 122 estimates the spatial position relationship of the imaging section 101 with respect to the marker. To be more specific, the superimposition parameter generation section 122 calculates the spatial position relationship (first position relationship) of the imaging section 101 with respect to the marker projected on the projection target (wall, for example), that is, the angle and the distance. Moreover, the superimposition parameter generation section 122 calculates the first superimposition parameter of the virtual information so as to have a matching between the coordinate system of the marker and the coordinate system of the virtual information (step S109). Thereafter, the superimposition parameter generation section 122 corrects the first superimposition parameter such that the virtual information is displayed more naturally for the user (step S110).

The conversion matrix calculation section 123 generates a spatial coordinate conversion matrix for converting the coordinate system with reference to the marker into the coordinate system with reference to the imaging section 101 in the real space using the first superimposition parameter (step S111). The image data generation section 124 subjects object data of the virtual information recorded in advance to coordinate conversion using the spatial coordinate conversion matrix supplied by the conversion matrix calculation section 123. In this manner, the image data generation section 124 calculates (renders) the object image data of the virtual information in the coordinate system with reference to the imaging section 101 (step S112). The image data generation section 124 supplies the generated object image data of the virtual information to the display section 102. The display section 102 displays the supplied object image data of the virtual information (step S113). Thereafter, the procedure from obtaining the image data in the real space for the next frame (step S102) to displaying the object image data of the virtual information (step S113) is repeatedly performed.

Next, described is a case where the display section 102 for the virtual information already displays the virtual information but the virtual-information-superimposed marker is not detected from the real image data (Yes in step S106). This case where the marker is not detected from the real image data occurs when the marker is projected outside of the imaging space for the imaging section 101 because the user has moved the input apparatus 200, for example, or when the user intentionally stops projection of the marker during the input operation with respect to the input apparatus 200, for example. If the marker is not detected from the real image data, the computing/update process is not performed on the first superimposition parameter based on the marker (step S109, for example). In addition, when the imaging section 101 is moved by the user's movement after no more detection of the marker from the real image data, the scenery of the real space in the user's field of view is changed but not the position and angle of the virtual information in the display space. Therefore, the virtual information remains displayed at the position and angle of causing the user to feel uncomfortable. In consideration thereof, in the first process, by detecting the characteristic points in the real space in real time (step S103), the virtual information is assumed to be continuously displayed with the spatial position relationship of the virtual information being retained with respect to the real space (second position relationship) immediately before the computing of the first superimposition parameter based on the marker is stopped (at the time point when the marker is detected last) after no more existence of the marker in the real image data.

That is, the superimposition parameter generation section 122 calculates the second superimposition parameter of the virtual information to have a matching between the coordinate system of the three-dimensional configuration of the real space estimated by the three-dimensional configuration estimation section 120 (step S105), and the coordinate system of the virtual information on display (step S114). Thereafter, the superimposition parameter generation section 122 corrects the second superimposition parameter similarly to step S110 (step S115).

The conversion matrix calculation section 123 generates a spatial coordinate conversion matrix for converting the coordinate system of the virtual information on display into the coordinate system of the three-dimensional configuration of the real space using the second superimposition parameter (step S116). The image data generation section 124 subjects the object data of the virtual information to coordinate conversion using the spatial coordinate conversion matrix supplied by the conversion matrix calculation section 123. In this manner, the image data generation section 124 calculates (renders) the object image data of the virtual information in the coordinate system of the three-dimensional configuration of the real space (step S117). The image data generation section 124 supplies the generated object image data of the virtual information to the display section 102. Other than this, when the virtual information is already displayed but there is any disappeared virtual-information-superimposed marker (Yes in step S118), the processes after step S114 are repeated.

[Effect of First Process]

As described above, according to the first process, the effect as below is expected.

1. When the display section already displays the virtual information but when the virtual-information-superimposed marker is not detected from the real image data, as to the superimposition parameter of the virtual information, the marker is difficult to be used as a basis to perform the computing/update process on the first superimposition marker. In addition, when the imaging section is moved by the user's movement after no more detection of the marker from the real image data, the scenery of the real space in the user's field of view is changed but not the position and angle of the virtual information in the display space. Therefore, the virtual information remains displayed at the position and angle of causing the user to feel uncomfortable.

However, in the first process, the second superimposition parameter of the virtual information is computed/updated to detect the characteristic points in the real space in real time, and to have a matching between the coordinate system of the three-dimensional configuration of the real space and the coordinate system of the virtual information on display. As a result, the virtual information can be continuously displayed with the spatial position relationship of the virtual information being retained with respect to the real space immediately before the computing of the first superimposition parameter based on the marker is stopped (at the time point when the marker is detected last) after no more existence of the marker in the real image data. Moreover, the marker-less AR system normally having had a need for the high computing power and the complicated hardware system/equipment can be implemented by a simple computing/system equivalent to the marker AR.

Figure 8:
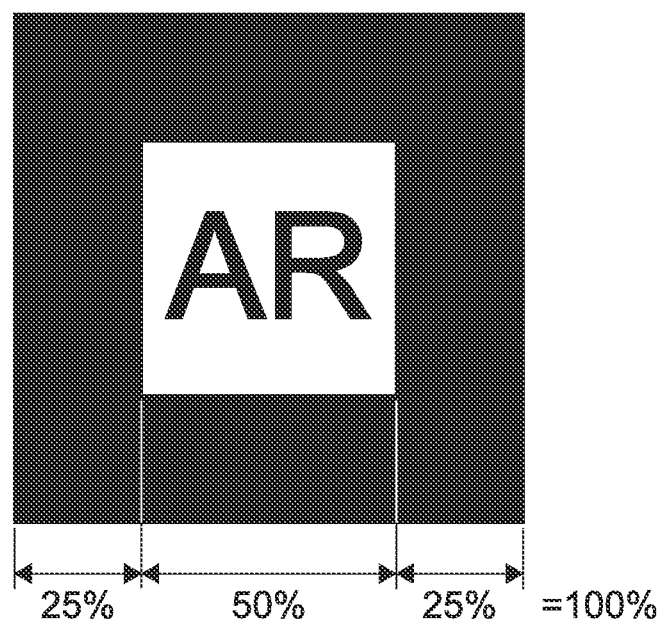
FIG. 8 is a diagram showing an exemplary marker for use with the marker AR.

2. In the physical marker used in "ARToolKit" most popular as an example of the marker AR, as shown in FIG. 8, an arbitrary pattern ("AR" in the example shown in the drawing) is rendered in a white region enclosed by a square-shaped black frame. The black frame is used to detect the marker, and the marker is discriminated in accordance with the pattern in the white region. Therefore, the AR marker of "ARToolKit" has restrictions on design as below.

To be square in shape in its entirety

To have a ratio among black frame:white region:black frame basically of 25%:50%:25%, and 3:14:3 at the minimum in the width or height direction of the square The pattern in the white region not to be symmetric with respect to a point/line, and not to be drawn by thin lines.

Necessary to have a margin around the marker to explicitly distinguish the black frame at the time of binarization.

However, with the marker by laser projection in the first process, the S/N (Signal/Noise) value can be very high, thereby eliminating the restrictions on the limited use of color (black/white), the restricted use of thin lines, and others. Moreover, because the margin is provided with the aim of separation from the background, the marker by laser projection in the first process is no more necessary to include the margin portion. In this manner, compared with the marker physically disposed in the real space, the design flexibility can be increased for the marker.

3. The virtual information displayed on the HMD is operated using the input apparatus including the projection section being the laser pointer or the laser projector. Therefore, the user can perform the operation intuitively and easily.

4. The present technology is applicable to the uses as below. By projecting the marker on the walls and windows existing in the real space, a projection target for the virtual information can be set to any arbitrary wall and window, and the arbitrary wall and window can be used as a projector screen and a white board being virtual. The specific applications are exemplified as below.

Display video pictures and planetarium images on a large screen.

Present virtual sticky notes and documents on partitions or on walls in the office.

Display and move a plurality of virtual sticky notes on a large screen.

Moreover, by moving the input apparatus, the position where the virtual information is superimposed is freely controlled. The specific applications are exemplified as below.

Walk a virtual pet as the virtual information by operating the input apparatus like a lead.

<Second Process>

[Overview of Second Process]

By referring to FIG. 2, described is a case where a plurality of HMDs 100 each display virtual information based on a marker projected by a user using the input apparatus 200. Note that, in the description below, the HMD worn by a user holding the input apparatus 200 for marker projection is referred to as "projection HMD", and the HMD worn by a user not holding the input apparatus 200 for marker projection is referred to as "no-projection HMD". A user U1 (first user) projects a marker M toward a projection target using the input apparatus 200. Next, assumed is a case where a no-projection HMD 100B worn by another user U2 (second user) displays virtual information with respect to the marker M, thereby presenting the virtual information to the second user U2. In this case, the no-projection HMD 100B of the second user U2 images the real space including the marker M projected by the input apparatus 200 of the first user U1, and using this real image, a superimposition parameter of the virtual information is calculated.

As a result, for example, there is a possibility of causing problems as below. It is assumed that the marker M projected by the first user U1 is in the distorted shape different from the shape of a reference marker on the projection target. If the no-projection HMD 100B of the second user U2 images the marker M, it means, not only the marker M is already in the distorted shape, but also it is imaged from a position different from the first user U1 holding the projection-performed input apparatus 200. Therefore, for calculating the superimposition parameter by the no-projection HMD 100B, there is a possibility of complicating the calculation by the no-projection HMD 100B because there needs to correct the distorted marker M to be in the shape of the reference marker, and to calculate a superimposition parameter with respect to the marker after the correction, for example. As a result, the calculation takes time, and it is difficult for the second user U2 to view in real time an object actually being viewed by the first user U1. That is, there is a possibility of causing a time lag between the display result of the projection HMD 100A, and the display result of the no-projection HMD 100B. Moreover, because the calculation is complicated, there is a possibility of impairing the correctness of the calculation by the non-projection HMD 100B, that is, causing a spatial deviation between the display result of the projection HMD 100A, and the display result of the no-projection HMD 100B. As a result, there is a possibility of causing a difference of the angle, the position, and the size of an object actually being viewed by the second user U2 from the angle, the position, and the size of an object, which is actually being viewed by the first user U1 and is assumed as being viewed also by the second user U2.

On the other hand, according to Patent Literature 4, for displaying an object as virtual information by a certain projector (first projector), a marker image is projected on a projection target (screen, for example) by another projector (second projector). Herein, the position relationship between the second projector and the projection target is set in advance. By an imaging apparatus (fixed point camera), this marker is imaged, and based on imaging data, the position, the angle, and the size of the object to be displayed are calculated so that the object is displayed on the projection target by the first projector. However, the technology of Patent Literature 4 has the following problems.

Being specific about the position for use because of necessity to prepare additional equipment such as a second projector and an imaging apparatus (fixed point camera).

Being specific about the position for use because of necessity for the positional fixation for the first projector and the projection target.

The use of the first projector only for projecting a marker being wasteful.

In consideration of the circumstances as above, the second process according to this embodiment of the present technology implements, with more ease and reliability, display of virtual information by each HMD at the angle, the position, and the size like when a plurality of users are viewing the same object from their individual positions through their HMDs.

[Functional Configuration of HMD for Execution of Second Process]

Figure 9:
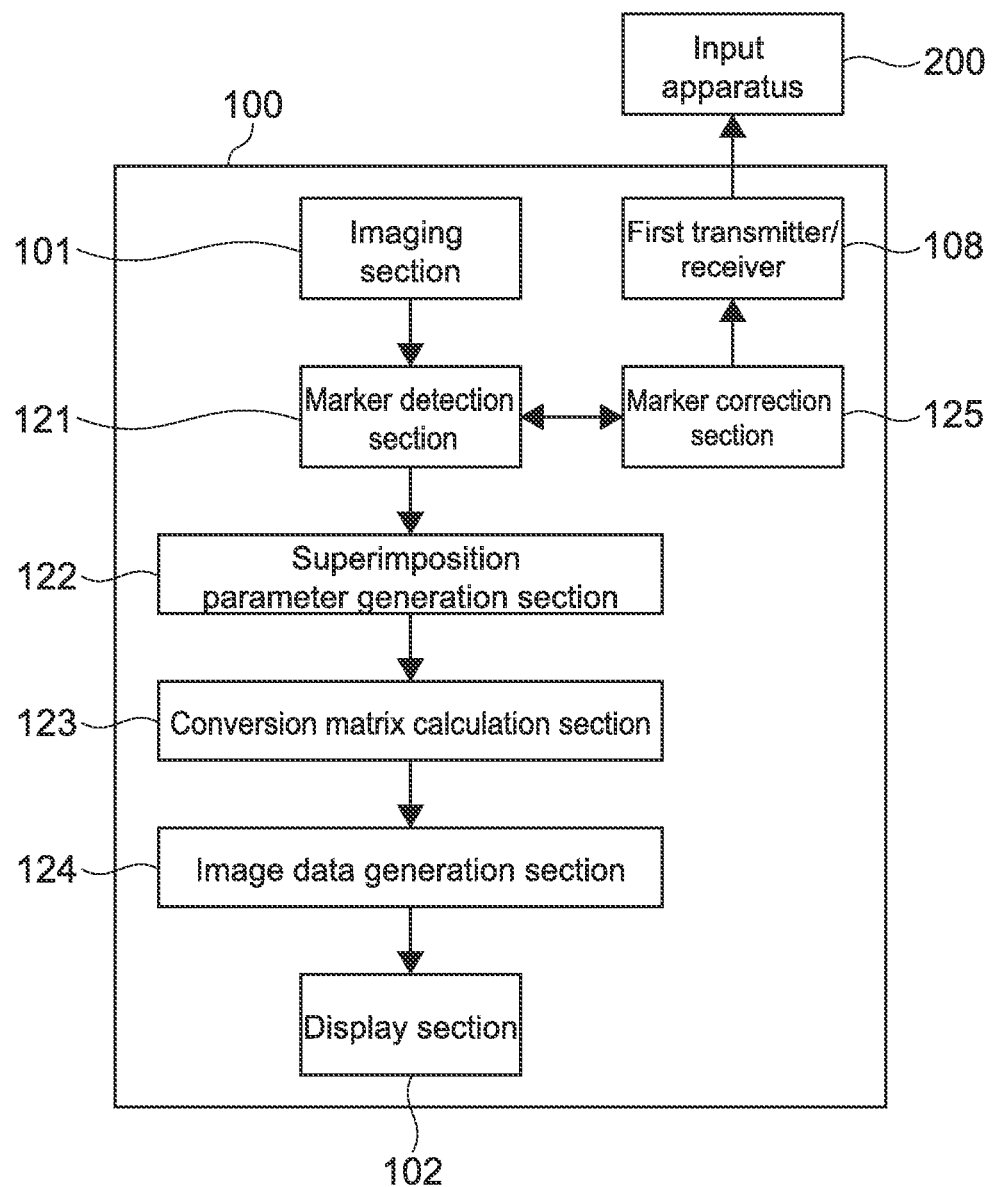
FIG. 9 is a block diagram showing the functional configuration of the HMD for execution of a second process.

FIG. 9 is a block diagram showing the functional configuration of the HMD 100 for execution of the second process.

The HMD (the projection HMD and the no-projection HMD) 100 includes the imaging section 101, the marker detection section 121, the superimposition parameter generation section 122, a marker correction section 125, the conversion matrix calculation section 123, the image data generation section 124, the display section 102, and the first transmitter/receiver 108.

In the below, the configuration, the functions, and others similar to the configuration, the functions, and others already described are not described again or not fully described, and any difference is mainly described.

Based on the distortion of the marker compared with the reference marker, the marker correction section 125 estimates the spatial position relationship of the imaging section 101 with respect to the marker. To be specific, the marker correction section 125 (angle obtaining section) calculates the spatial position relationship of the imaging section 101 with respect to the marker projected on a projection target (desk, for example), that is, the angle and distance of the imaging section 101 with respect to the projection target (the angle and distance between the optical axis of a marker image projected by the input apparatus 200 and the surface of the projection target in the real scenery). Based on the calculated angle and distance, the marker correction section 125 generates a plane coordinate conversion matrix for correcting the detected marker with distortion to have the shape of the reference marker. The marker correction section 125 performs coordinate conversion on the detected marker using the plane coordinate conversion matrix, thereby calculating a corrected marker. This "corrected marker" is a marker that may be in the shape of the reference marker on the projection target when it is projected from the current position of the input apparatus 200 toward the projection target. The marker correction section 125 (distortion creation section) notifies the calculated corrected marker to the input apparatus 200 using the first transmitter/receiver 108. In this manner, the input apparatus 200 becomes able to stop projecting the distorted marker and start projecting the corrected marker. Moreover, the marker correction section 125 notifies the marker detection section 121 that the corrected marker is notified to the input apparatus 200.

[Operation in Second Process by HMD]

Figure 10:
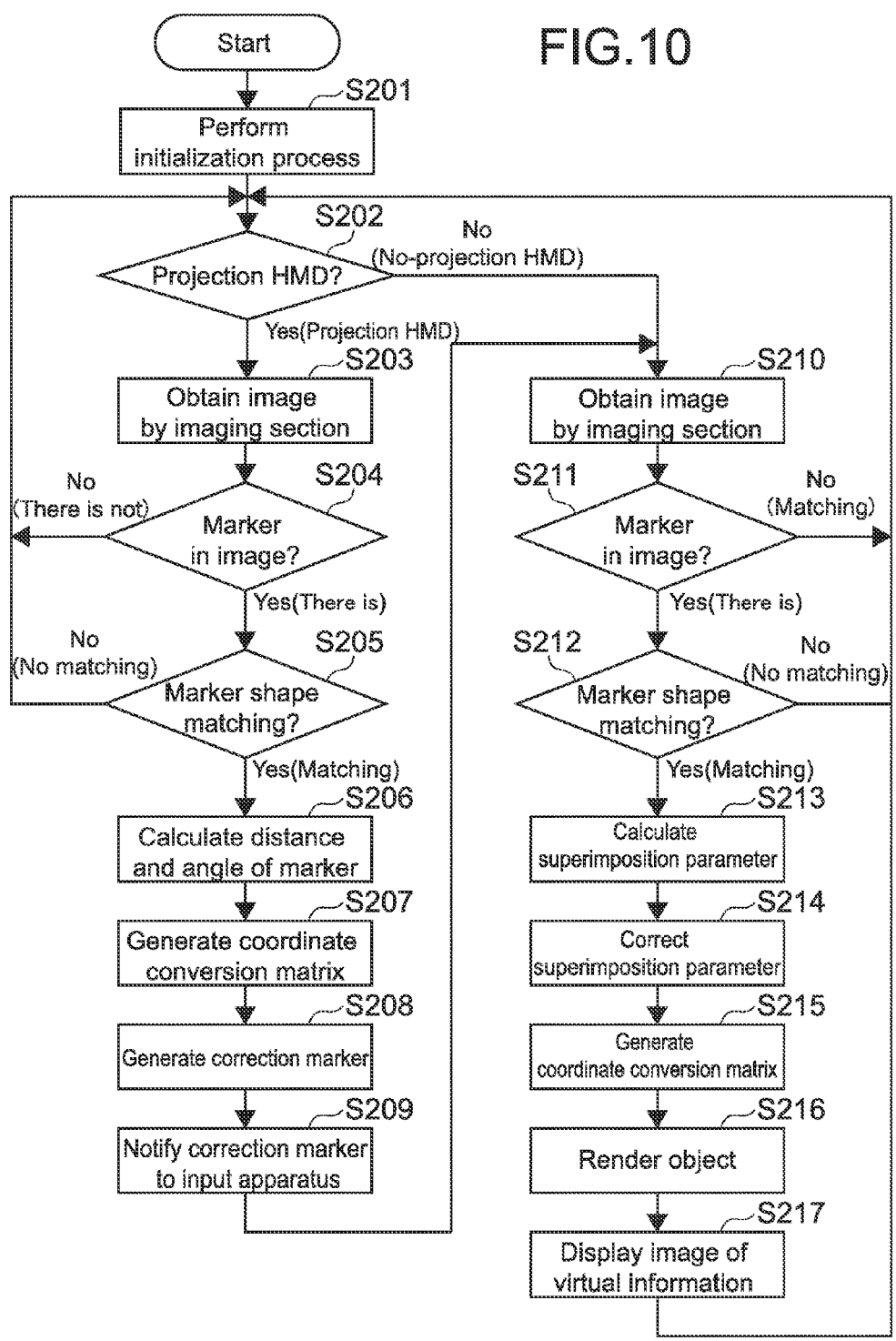
FIG. 10 is a flowchart showing the operation in the second process by the HMD.

FIG. 10 is a flowchart showing the operation in the second process by the HMD 100.

The CPU 103 executes a predetermined initialization process (step S201), and determines whether the HMD thereof is the projection HMD, that is, whether a marker is to be projected by the input apparatus 200 held by a user wearing the HMD thereof (step S202). To be specific, for example, the HMD 100 may be registered in advance with an apparatus ID of the input apparatus 200 owned by the user wearing the HMD thereof, and the CPU 103 may use the first transmitter/receiver 108 to inquire the input apparatus 200 identified by the apparatus ID about whether the marker projection is performed or not. Alternatively, the user may make an input to the input section 105 about whether the input apparatus 200 held by this user projects a marker or not.

First of all, described is the operation of the projection HMD (Yes in step S202). Similarly to steps S102, S107, and S108, the projection HMD obtains the real image data (step S203), performs marker detection (Yes in step S204), and determines a degree of matching (step S205). The marker detection section 121 supplies the determination result about the degree of marker matching to the marker correction section 125.

As to the marker showing a predetermined degree of matching (Yes in step S205), the marker correction section 125 estimates the spatial position relationship of the imaging section 101 with respect to the marker based on the distortion of the marker compared with the reference marker. To be specific, the marker correction section 125 (angle obtaining section) calculates the angle and distance of the imaging section 101 with respect to the marker projected on the projection target (desk, for example) (the angle and distance between the optical axis of a marker image projected by the input apparatus 200 and the surface of the projection target in the real scenery) (step S206). Based on the calculated angle and distance, the marker correction section 125 generates a plan coordinate conversion matrix for correcting the detected marker with distortion into the shape of the reference marker (step S207). The marker correction section 125 performs coordinate conversion on the detected marker using the plane coordinate conversion matrix, thereby calculating a corrected marker (step S208). The marker correction section 125 (distortion creation section) notifies the calculated corrected marker to the input apparatus 200 using the first transmitter/receiver 108 (step S209). In this manner, the input apparatus 200 becomes able to stop projecting the distorted marker and start projecting the corrected marker. Moreover, the marker correction section 125 notifies the marker detection section 121 that the corrected marker is notified to the input apparatus 200.

After the marker correction section 125 notifies the corrected marker to the input apparatus 200 (step S209), the real image data is obtained (step S210), the corrected marker is detected (Yes in step S211), and a degree of matching is determined about the corrected marker (step S212). The marker detection section 121 supplies the determination result to the superimposition parameter generation section 122. Thereafter, similarly to steps S109 to S113, the first superimposition parameter is calculated and corrected (steps S213 and S214), a coordinate conversion matrix is generated (step S215), and object image data is calculated and displayed (steps S216 and S217).

On the other hand, the no-projection HMD (No in step S202) executes the processes in steps S210 to S217. Herein, when the marker to be detected (Yes in step S211) is a corrected marker, it means that the no-projection HMD calculates the first superimposition parameter based on the corrected marker in the shape of the reference marker.

[Effect of Second Process]

As described above, with the second process, the following effect is expected.

Figure 11:
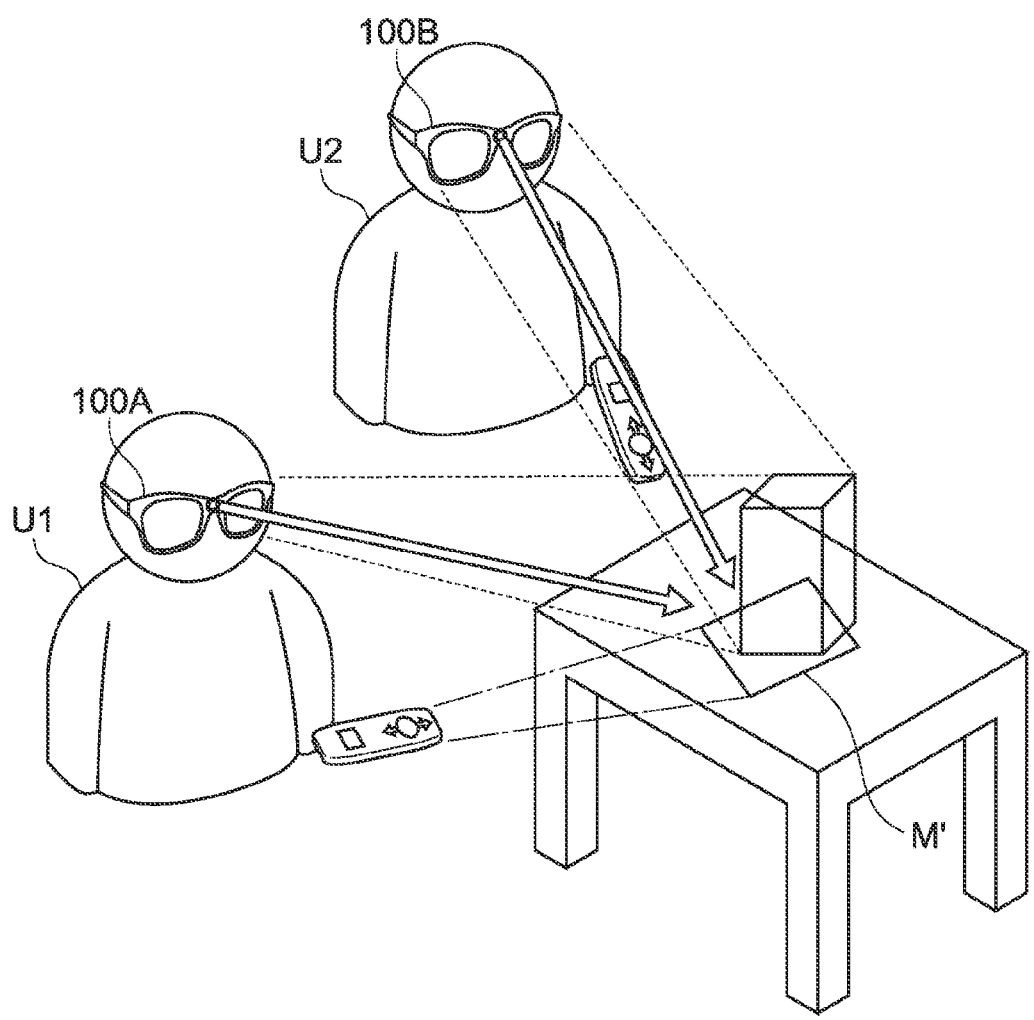
FIG. 11 is a diagram for illustrating the effect to be obtained by the second process.

1. As shown in FIG. 11, a corrected marker M' projected by the first user U1 is in the shape of the reference marker that is free from distortion on the projection target. Accordingly, for calculating the superimposition parameter by the no-projection HMD 100B of the second user U2, there is no need to correct the distorted marker (M of FIG. 2) to be in the shape of the reference marker, and there only needs to calculate the superimposition parameter with respect to the corrected marker M' so that the calculation amount by the no-projection HMD 100B can be small. As a result, the time to be taken for the calculation can be short, thereby allowing the second user U2 to view in real time the object actually being viewed by the first user U1. That is, this hardly causes a time lag between the display result of the projection HMD 100A and the display result of the no-projection HMD 100B, and even if it is caused, the value of the time lag may be negligibly small. Moreover, the calculation by the no-projection HMD 100B remains correct. That is, a spatial deviation is hardly caused between the display result of the projection HMD 100A and the display result of the no-projection HMD 100B. As a result, when the virtual information operated by the first user U1 is viewed by a plurality of users, the object to be displayed by the HMDs respectively worn by the users show little deviation in angle, position, and size.

Alternatively, the superimposition parameter generation section 122 may generate the superimposition parameter based on the angle and distance of the imaging section 101 with respect to the marker projected on the projection target (desk, for example) (the angle and distance between the optical axis of a marker image projected by the input apparatus 200 and the surface of the projection target in the real scenery) (step S206).

<Third Process>

[Overview of Third Process]

Figure 12:
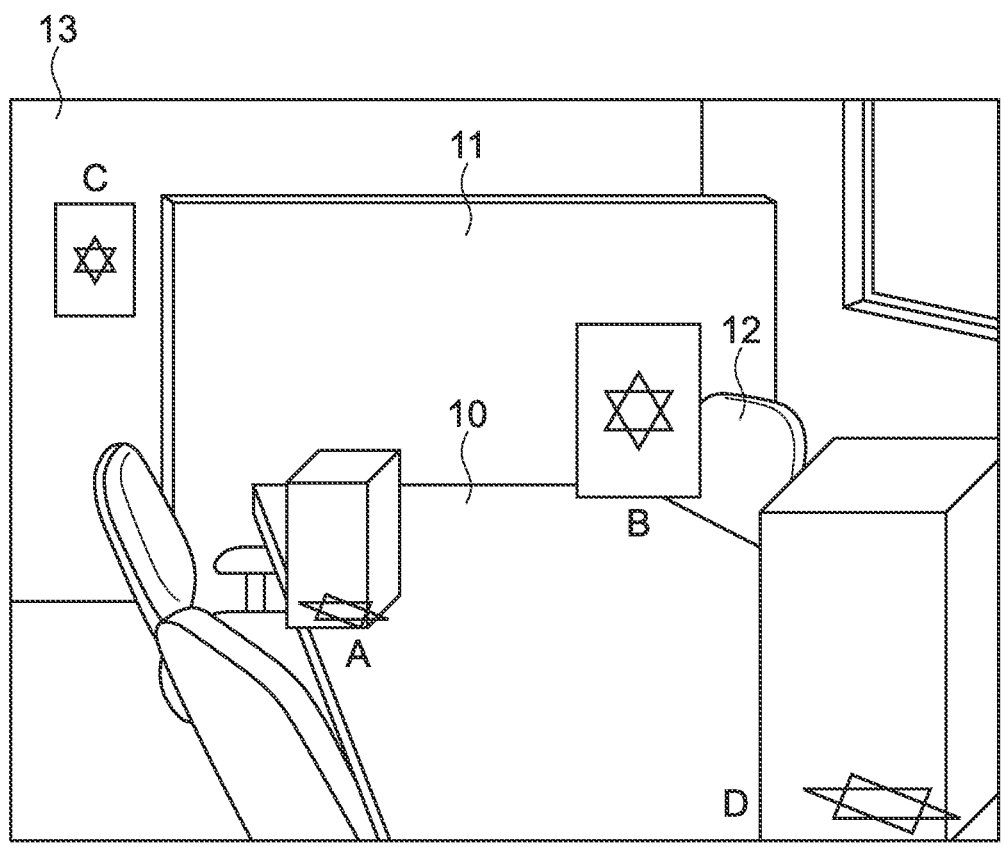
FIG. 12 is a diagram for illustrating an overview of a third process.

If the virtual information is displayed irrespective of the type and position of the projection target on which the marker is projected, as shown in FIG. 12, the following display states may be caused.

When the marker is projected at the corner of a desk 10, the virtual information is partially off the desk 10, and is displayed as if it is floating in the air (A in the drawing).

When the marker is projected on a partition 11, if there is any other object such as a chair 12 or the desk 10 in the vicinity of the projection position of the marker, the virtual information is partially displayed on the object (B in the drawing).

In an attempt to project the marker on the relatively-small-sized partition 11, if the marker is not projected on the partition 11 but on a wall 13 located away, the virtual information is displayed on the wall 13 located away (C in the drawing).

When the marker is projected at a position too close to the user, the virtual information is displayed at a position where it is difficult for the display section 102 to form an image well in terms of hardware performance (D in the drawing).

In the states as described above, there is a possibility that the user may feel uncomfortable or annoying, or feel physical pain (eye fatigue, for example).

In consideration of the circumstances as described above, with the third process according to this embodiment of the present technology, when there is a possibility of causing the user to feel uncomfortable or others if the virtual information is displayed based on the marker, the virtual information is displayed in the state of hardly causing the possibility that the user feels uncomfortable, for example. To be specific, by following a predetermined rule, a determination is made whether the content of the virtual information is against the natural law when it is displayed with superimposition on the real space, and/or whether or not the condition for the expected visual quality is satisfied, and when it is against, the display of the virtual information is cancelled.

[Functional Configuration of HMD for Execution of Third Process]

Figure 13:
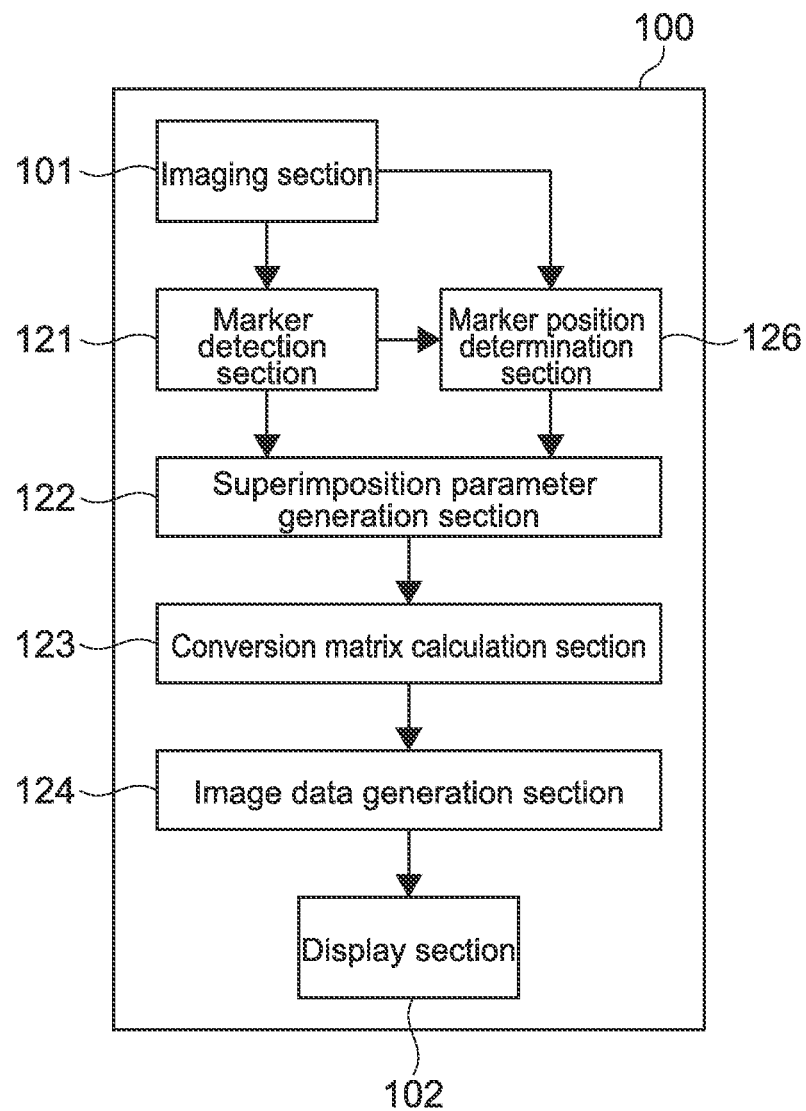
FIG. 13 is a block diagram showing the functional configuration of the HMD for execution of the third process.

FIG. 13 is a block diagram showing the functional configuration of the HMD 100 for execution of the third process.

The HMD 100 includes the imaging section 101, the marker detection section 121, the superimposition parameter generation section 122, a marker position determination section 126, the conversion matrix calculation section 123, the image data generation section 124, and the display section 102.

The marker position determination section 126 determines the spatial position relationship (third position relationship) of the marker detected by the marker detection section 121 with respect to the real space, and supplies the determination result to the superimposition parameter generation section 122.

[Operation in Third Process by HMD]

Figure 14:
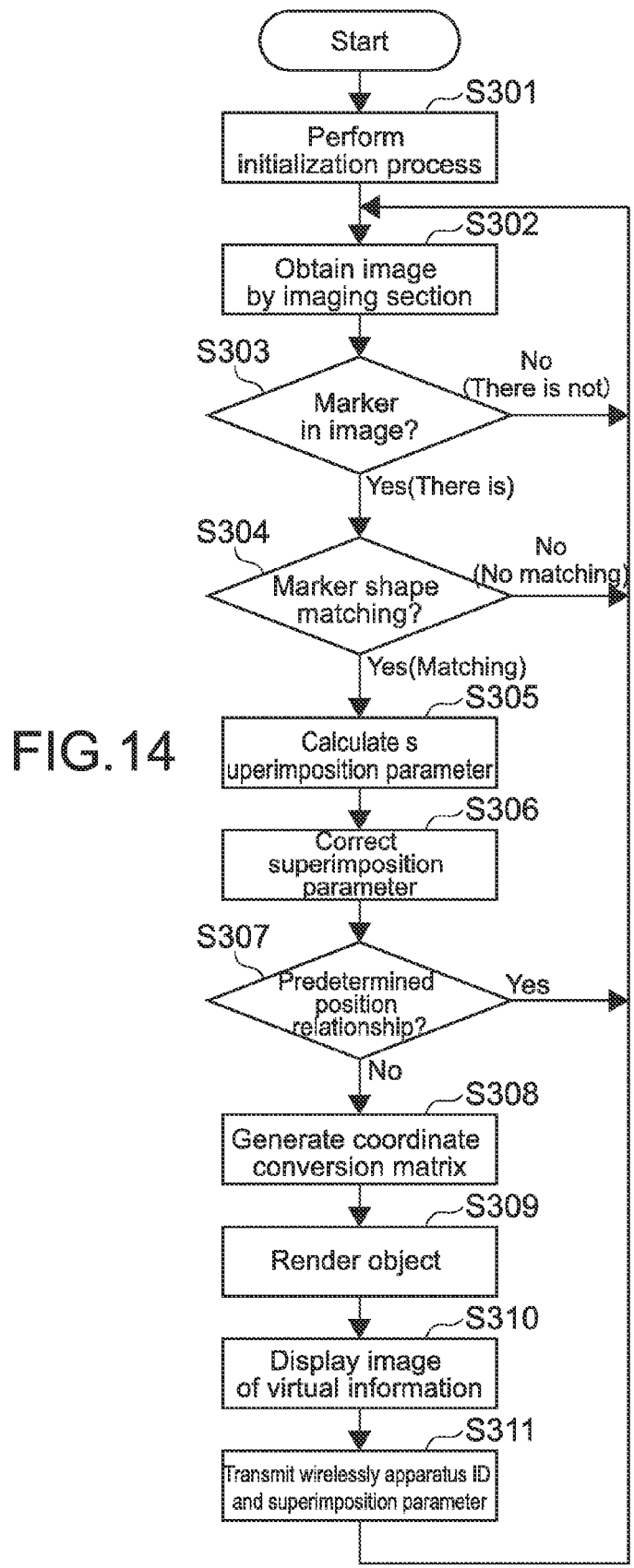
FIG. 14 is a flowchart showing the operation in the third process by the HMD.

FIG. 14 is a flowchart showing the operation in the third process by the HMD 100.

When the CPU 103 performs a predetermined initialization process (step S301), the imaging section 101 obtains real image data (step S302). The imaging section 101 supplies the obtained real image data to the marker detection section 121 and to the marker position determination section 126. Similarly to step S107, the marker detection section 121 detects a marker (Yes in step S303), and supplies the detection result to the superimposition parameter generation section 122 and to the marker position determination section 126. Thereafter, similarly to steps S108 to S110, a degree of matching is determined (step S304), and the first superimposition parameter is calculated and corrected (steps S305 and S306).

Based on the real image data provided by the imaging section 101, and the marker detected by the marker detection section 121, the marker position determination section 126 determines the spatial position relationship of the marker with respect to the real space, and supplies the determination result to the superimposition parameter generation section 122. When the determination result provided by the marker position determination section 126 indicates that a predetermined position relationship is established (Yes in step S307), the superimposition parameter generation section 122 (second virtual information display control section) does not supply the generated (steps S305 and S306) first superimposition parameter to the conversion matrix calculation section 123. As a result, the display process by this first superimposition parameter is not executed. On the other hand, when the predetermined position relationship is not established (No in step S307), the superimposition parameter generation section 122 supplies the generated (steps S305 and S306) first superimposition parameter to the conversion matrix calculation section 123.

This "predetermined position relationship" is the position relationship with which, when the virtual information is displayed with superimposition on the real space, the content thereof is against the natural law and/or the condition for the expected visual quality is not satisfied. The "position relationship against the natural law and/or not satisfying the condition for the expected visual quality" is the position relationship with which, when the virtual information is displayed with superimposition on the real space, the user may feel uncomfortable or annoying, or feel physical pain (eye fatigue, for example). As the "position relationship against the natural law and/or not satisfying the condition for the expected visual quality", specifically, as shown in FIG. 12, the following position relationship is exemplified as below.

The shortest distance between the contour of a target on which a marker is projected (desk, wall, and others, and hereinafter referred to as "projection target") and the marker is smaller than a predetermined value (A in FIG. 12). Or at least a part of the marker is overlaid on the contour of the projection target.

There is any other object such as a pillar, a chair, a desk, and others within a predetermined distance range from the marker (B in FIG. 12).

The distance between the marker and the imaging section 101 is equal to or larger than a predetermined value (the marker is too far away) (C in FIG. 12).

The distance between the marker and the imaging section 101 is smaller than the predetermined value (the marker is too close) (D in FIG. 12).

By referring back to FIG. 14, after obtaining the first superimposition parameter (No in step S307), similarly to steps S111 to S113, the conversion matrix calculation section 123 generates a coordinate conversion matrix (step S308), and calculates and displays object image data (steps S309 and S310). When there is a plurality of users each wearing the HMD 100, the HMD 100 transmits the apparatus ID thereof and the superimposition parameter thereof to the other HMDs 100 (step S311). Note that, when the determination result in step S307 shows that the predetermined position relationship is established (Yes in step S307), the following process may be executed by the image data generation section 124 (second virtual information display control section).

Figure 15:
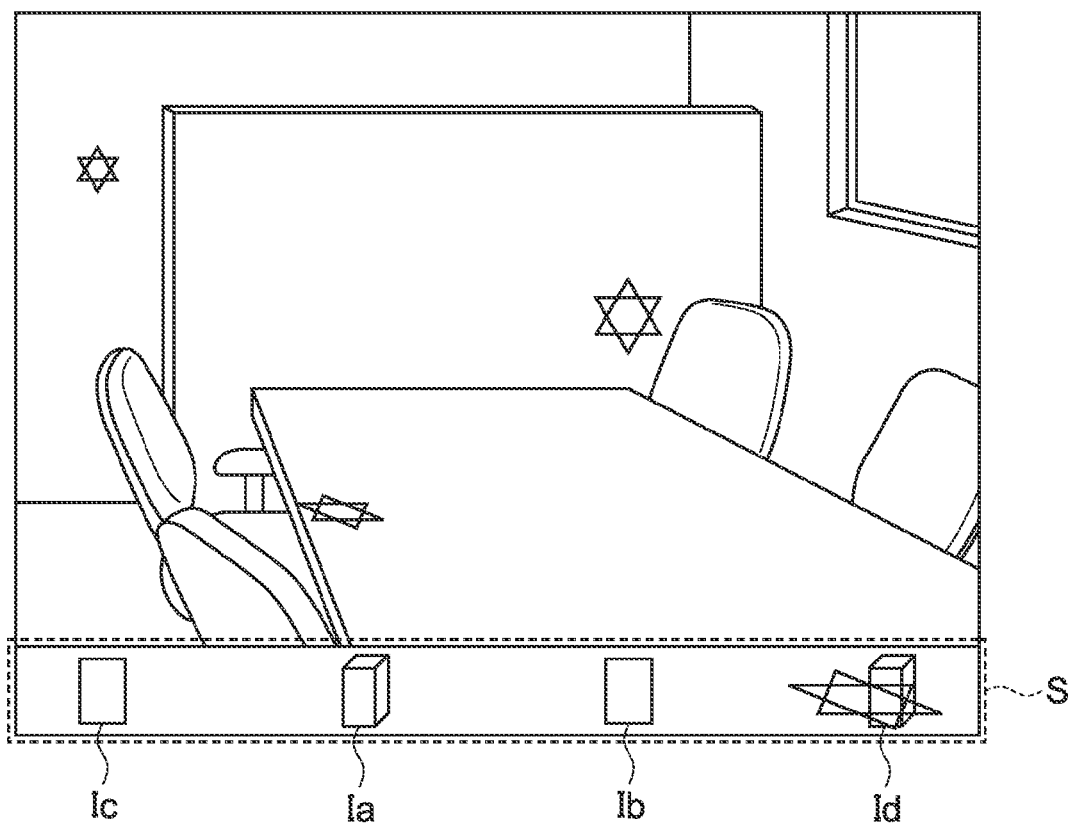
FIG. 15 is a diagram showing the display result by the third process.

As shown in FIG. 15, the virtual information on display is deleted.

In addition, as shown in FIG. 15, the virtual information is reduced in size or iconized to generate image data Ia, Ib, Ic, and Id for display on a safe region S in the field of view. This "safe region" may be the position where interference with objects existing in the real space is hardly caused, the position before the range where the display section 102 can form images (in or below the field of view range), the position at an end portion of the field of view range not disturbing the field of view, and others.

Figure 16:
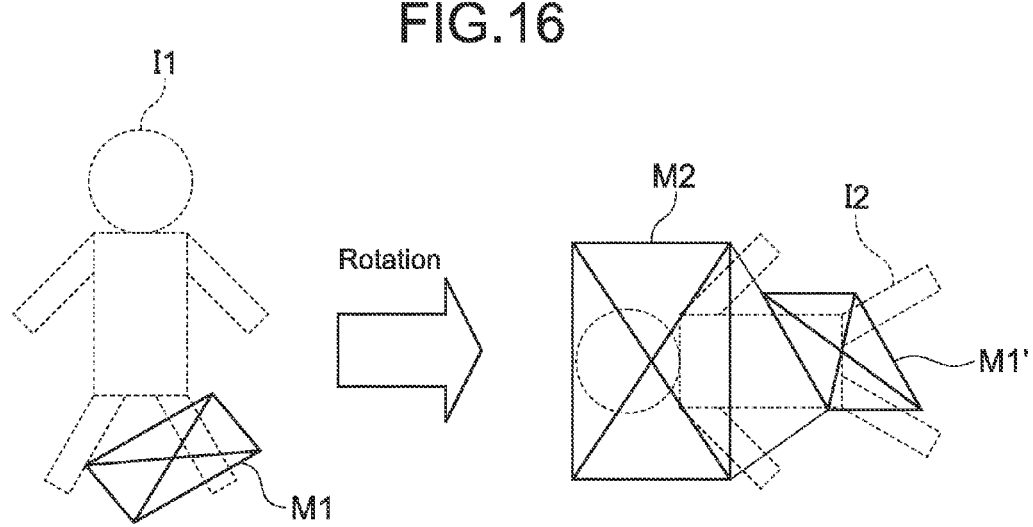
FIG. 16 is a diagram schematically showing distortion of the marker.

When the shortest distance between the contour of a target on which a marker is projected (desk, wall, and others, and hereinafter referred to as "projection target") and the marker is smaller than a predetermined value (A in FIG. 12), or when at least a part of the marker is overlaid on the contour of the projection target, the following process may be executed. When the input apparatus is an apparatus such as laser projector that can project any arbitrary graphic form, the projected marker is changed in size and shape to correspond to the size and shape of the virtual information to be displayed. In this manner, the user is allowed to grasp intuitively the possibility of interference between the real space and the virtual information. As an example, as shown in FIG. 16, in the state where the marker M1 is already projected and virtual information 11 is displayed, which is shown in the left part of FIG. 16, it is assumed that the user's input operation changes the orientation and posture of the virtual information 11 to those of virtual information 12 (the virtual information 11 is rotated). In this case, a marker M1' after the rotation of the marker M1 is changed to a marker M2 that is so shaped as to be overlaid on most of the virtual information 12, which is shown in the right part of FIG. 16. In this manner, the user is allowed to grasp intuitively whether at least a part of the marker is overlaid on the contour of the projection target.

[Effect of Third Process]

As described above, with the third process, the following effect is expected. 1. When there is a possibility of causing the user to feel uncomfortable or annoying, or feel physical pain (eye fatigue, for example) if the virtual information is displayed based on the marker, the virtual information can be displayed in the state of hardly causing the possibility of causing the user to feel uncomfortable, for example.

Second Embodiment

[Overview of Second Embodiment]

A second embodiment can implement display of virtual information by a plurality of HMDs (projection HMD, no-projection HMD) performed in the second process in the first embodiment, and can achieve the effect similar to that of the second process.

Figure 17:
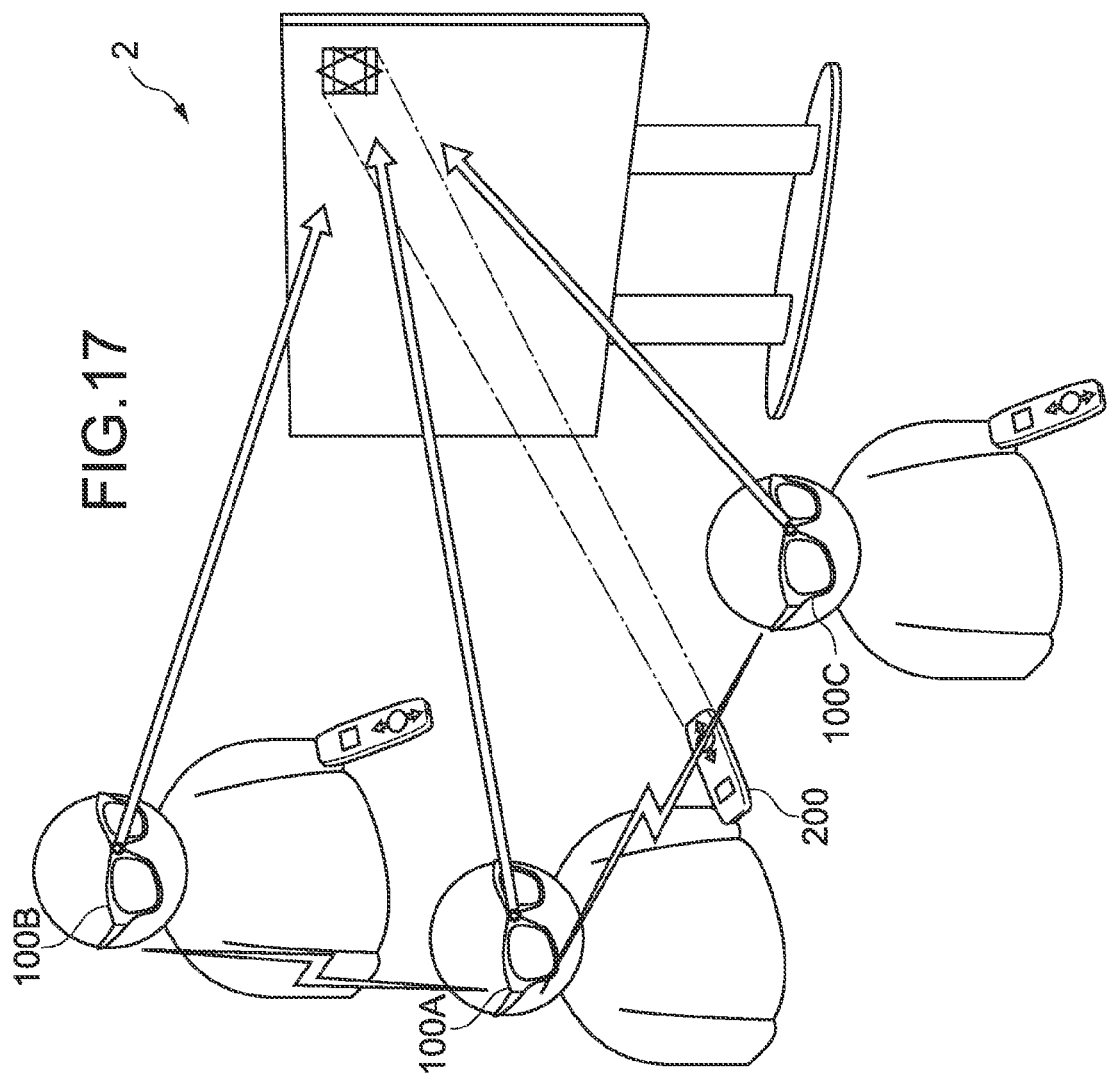
FIG. 17 is a schematic diagram showing an information processing system according to a second embodiment of the present technology.

FIG. 17 is a schematic diagram showing an information processing system 2 according to the second embodiment of the present technology.

In this embodiment, a superimposition parameter of the projection HMD 100A is shared by a plurality of no-projection HMDs 100B and 100C by wireless communication. By using the superimposition parameter of the projection HMD 100A, the no-projection HMDs 100B and 100C correct superimposition parameters of the HMDs 100B and 100C. In this manner, also in the second embodiment, when a plurality of users view virtual information operated by a single user, objects to be displayed by the HMDs (the projection HMD, the no-projection HMD) worn by the users are less distorted in angle, position, and size.

[Hardware Configuration of HMD]

Figure 18:
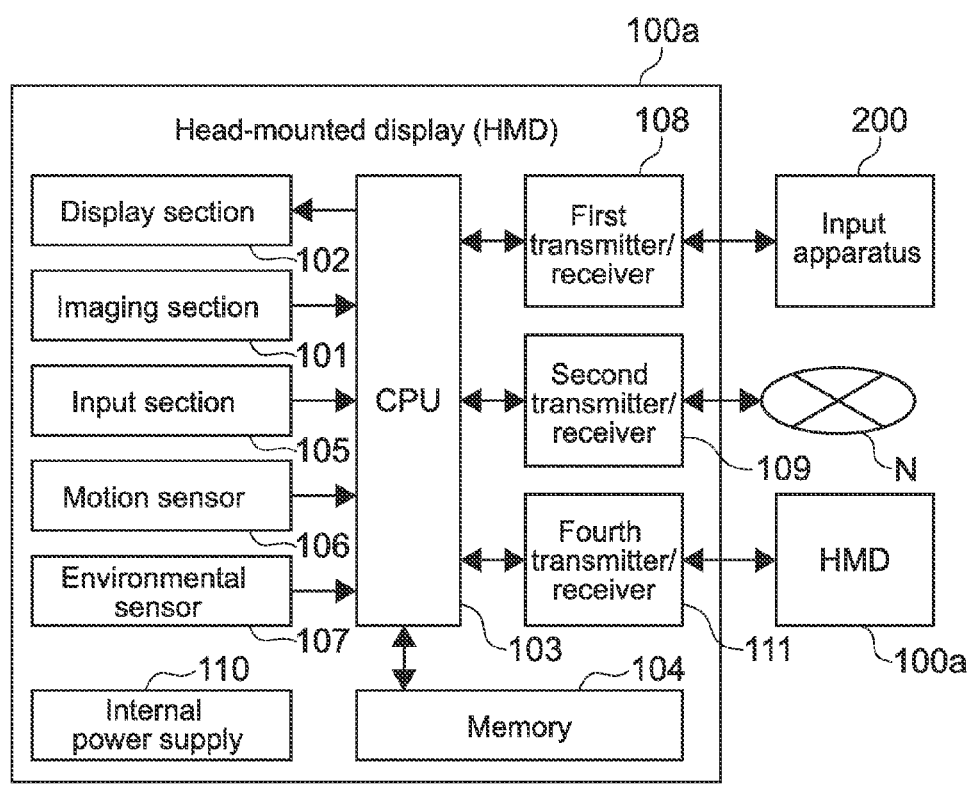
FIG. 18 is a block diagram showing the hardware configuration of the HMD according to the second embodiment.

FIG. 18 is a block diagram showing the hardware configuration of an HMD (projection HMD, no-projection HMD) 100a according to the second embodiment. The HMD 100a includes a fourth transmitter/receiver 111 in addition to the hardware configuration of the HMD 100 in the first embodiment (FIG. 3).

The fourth transmitter/receiver 111 is a short-range wireless transmitter/receiver such as Bluetooth (trade mark) and infrared rays, and performs information exchange with any other HMDs 100a. To be more specific, the fourth transmitter/receiver 111 (transmission section) executes a process of transmitting/receiving to/from the no-projection HMD 100a for shared use of the superimposition parameter of the projection HMD 100a with the no-projection HMD 100a.

[Operation by HMD]

First of all, described are (1) the operation of the projection HMD 100a, and next, (2) the operation of the no-projection HMD 100a.

[(1) Operation by Projection HMD]

Figure 19:
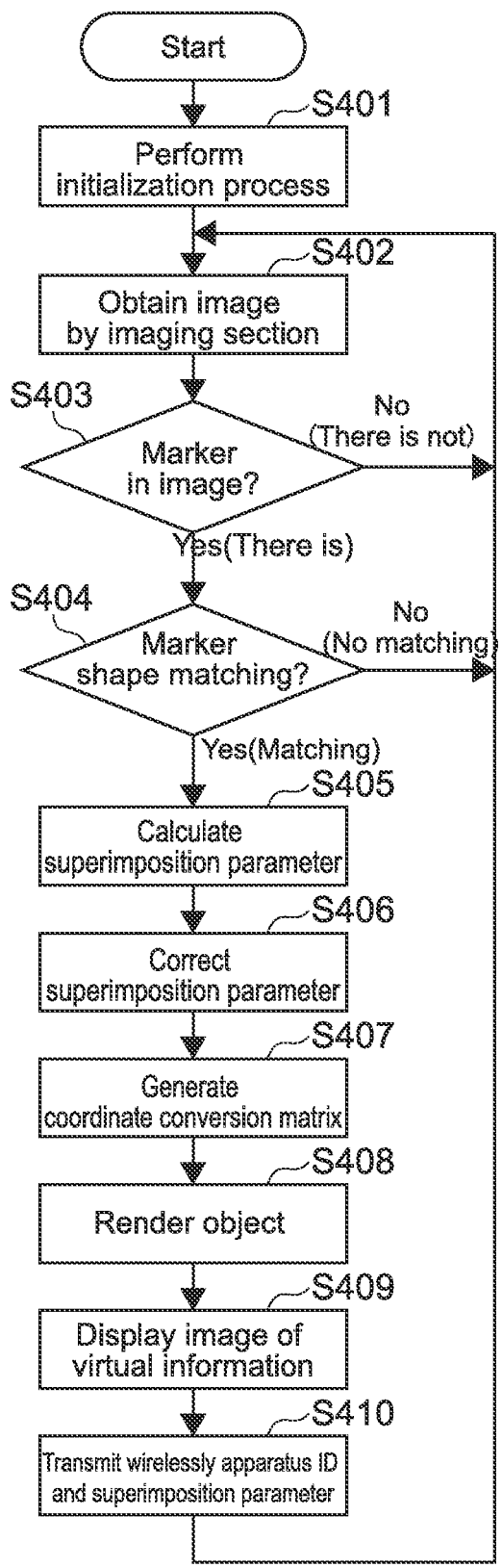
FIG. 19 is a flowchart showing the main operation by a projection HMD.

FIG. 19 is a flowchart showing the main operation of the projection HMD 100a.

When the CPU 103 performs a predetermined initialization process (step S401), similarly to step S102, and steps S107 to S113, the projection HMD 100a obtains real image data (step S402), performs marker detection (step S403), determines a degree of marker matching (step S404), calculates and corrects the superimposition parameter (steps S405, and S406), generates a coordinate conversion matrix (step S407), calculates object image data (step S408), and displays the object image data (step S409). Thereafter, the projection HMD 100a transmits the apparatus ID of the HMD 100a, and the superimposition parameter obtained in step S406 to the other HMDs 100a using the fourth transmitter/receiver 111 (transmission section) (step S410). In this manner, the superimposition parameter of the projection HMD 100a is shared by the no-projection HMD 100a.

[(2) Operation by No-Projection HMD]

Figure 20:
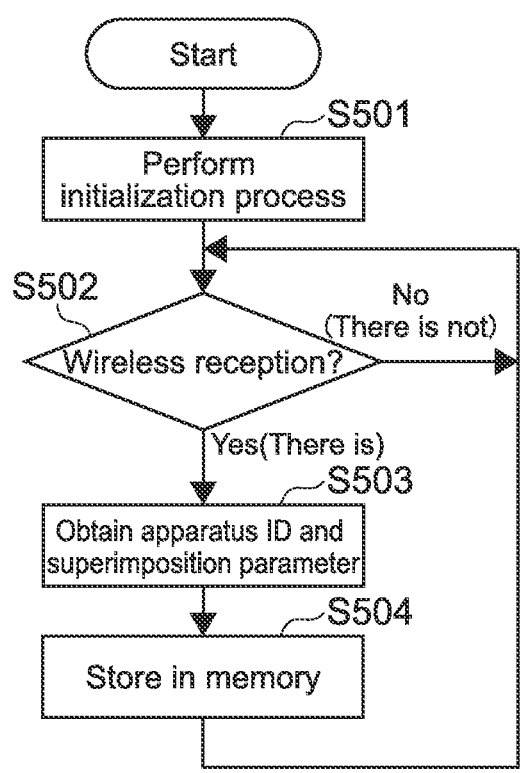
FIG. 20 is a flowchart showing the operation of obtaining a superimposition parameter of the projection HMD by a no-projection HMD.

FIG. 20 is a flowchart showing the operation of obtaining a superimposition parameter of the projection HMD 100a by the no-projection HMD 100a.

The CPU 103 performs a predetermined initialization process (step S501), and the fourth transmitter/receiver 111 receives the apparatus ID and the superimposition parameter transmitted (step S410) by the projection HMD 100a (Yes in step S502). The CPU 103 stores the obtained (Step S503) apparatus ID and the superimposition parameter in the memory 104 (step S504).

The main operation by the no-projection HMD 100a is similar to the main operation by the projection HMD 100a (steps S401 to S410), and described is only a difference by referring to the flowchart of FIG. 19. In step S406, the superimposition parameter generation section 122 (correction section) of the no-projection HMD 100a corrects the superimposition parameter based on the superimposition parameter of the projection HMD 100a stored (step S504) in the memory 104.

Note that the operation of obtaining the superimposition parameter of the projection HMD 100a (steps S501 to S504) by the no-projection HMD 100a may be performed by interruption or multi-thread with respect to the main process (steps S401 to S410). Moreover, when the position of the user is largely moved at the time of starting the operation or during the operation, the plurality of users may all perform a calibration step of projecting the marker at an arbitrary position of the projection target.

[Effect of Second Embodiment]

As described above, according to the second embodiment, the following effect is expected.

1. The no-projection HMD corrects the superimposition parameter calculated based on the angle and distance between the HMD itself and the projection target (wall, for example) on which the marker is projected, based on the superimposition parameter of the projection HMD. This allows the calculation by the no-projection HMD to remain correct, that is, hardly causes a spatial deviation between the display result of the projection HMD and the display result of the no-projection HMD. As a result, even if a plurality of users view the virtual information operated by a single user, objects to be displayed by the HMDs worn by the users are less distorted in angle, position, and size.

Modification Example 1

A modification example 1 can implement display of virtual information by a plurality of HMDs (projection HMD, no-projection HMD) performed by the second process in the second embodiment, and can achieve the effect similar to that of the second process.

Figure 21:
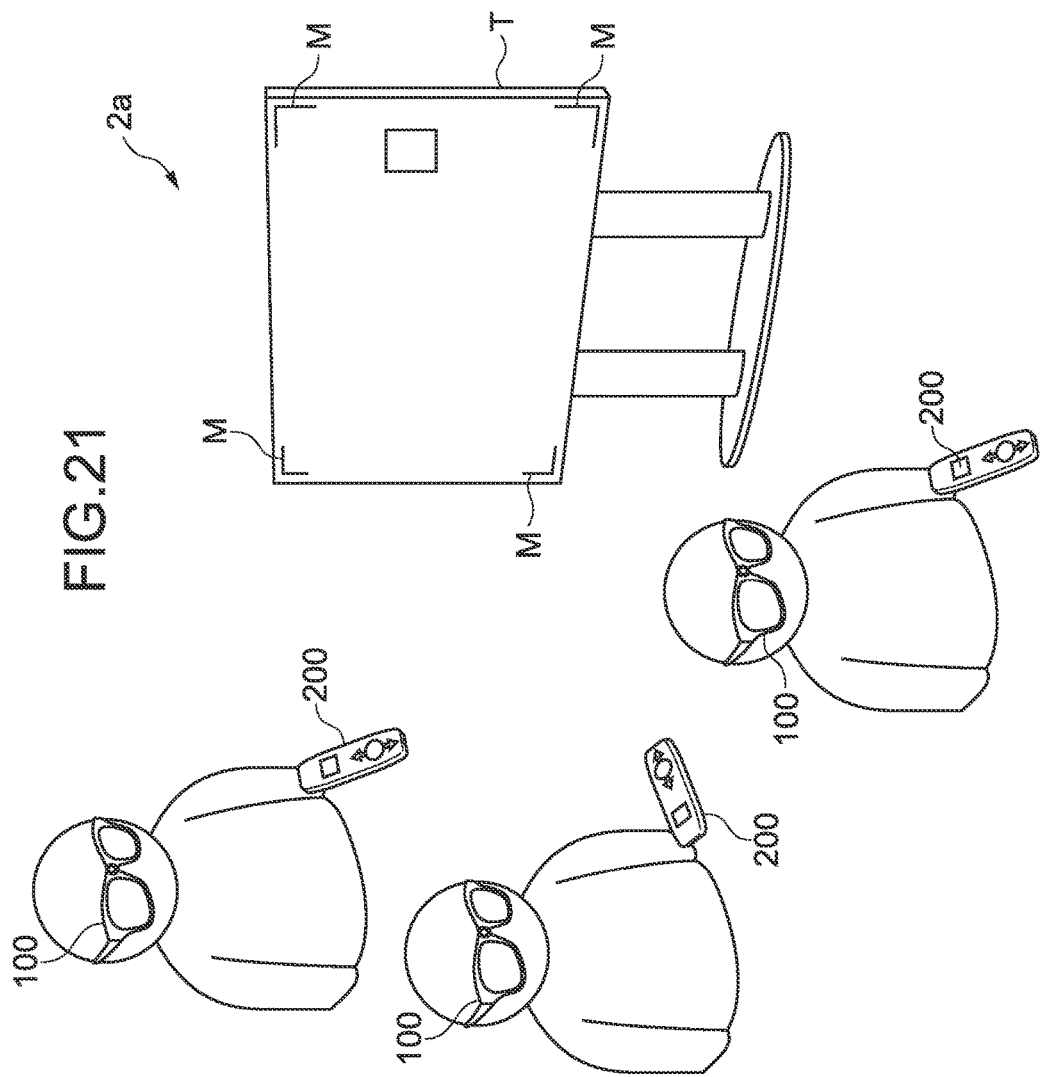
FIG. 21 is a schematic diagram showing an information processing system according to a modification example 1.

FIG. 21 is a schematic diagram showing an information processing system 2a according to the modification example 1.

A display target T being a display target of virtual information (wall, partition, and others) is provided with an existing physical marker M. A plurality of HMDs 100 each calculate the distance and angle between the HMD and the marker M provided to the display target T.

Also in this manner, the calculation by the plurality of HMDs can remain correct, that is, expected is the effect of hardly causing a time lag and a spatial deviation between the display results by the plurality of HMDs.

Modification Example 2

Figure 22:
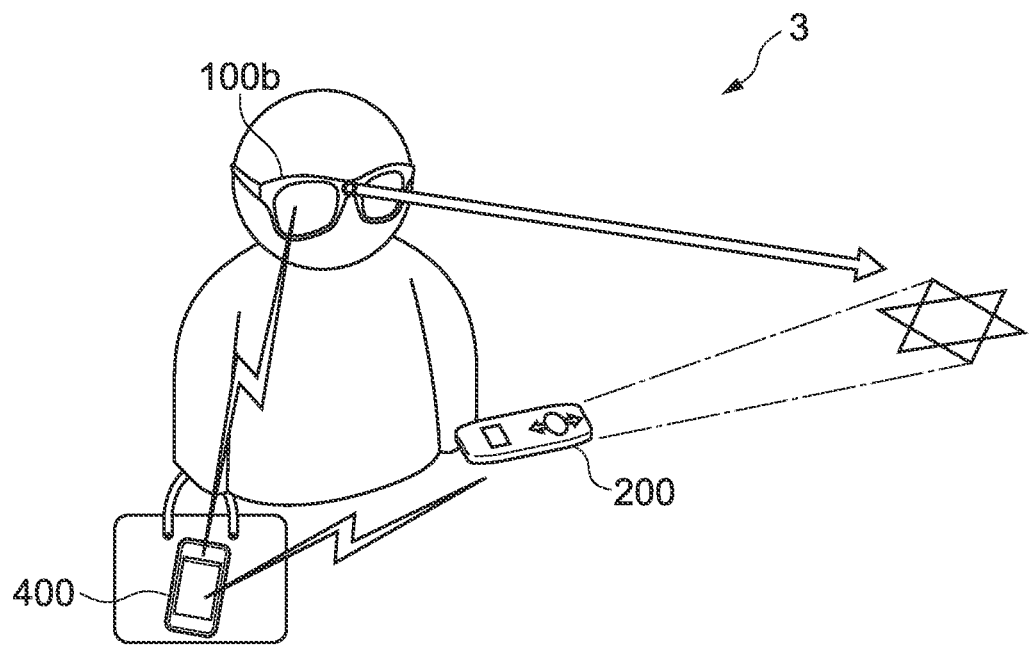
FIG. 22 is a schematic diagram showing an information processing system according to a modification example 2.
Figure 23:
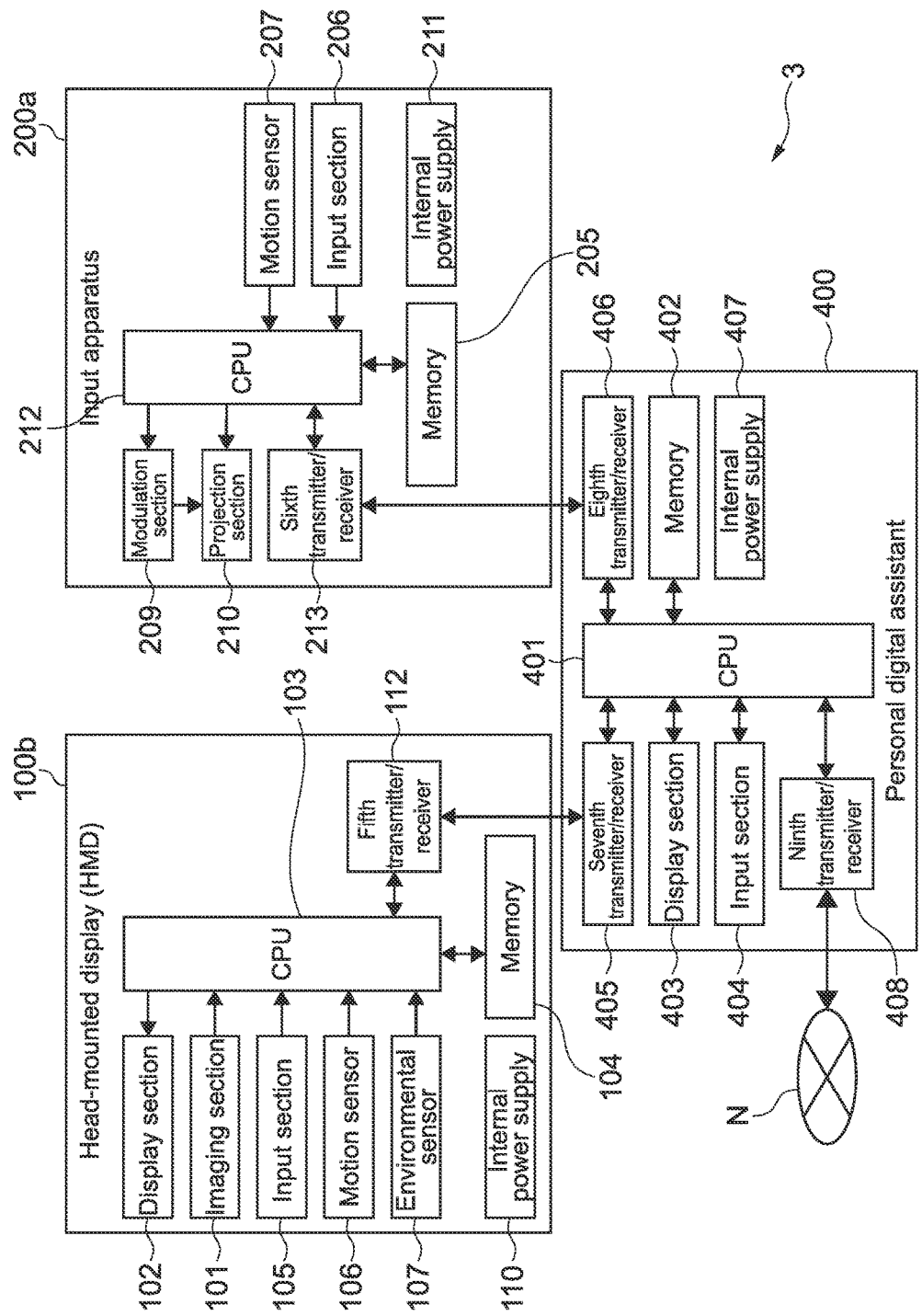
FIG. 23 is a block diagram showing the hardware configuration of the information processing system according to the modification example 2.

FIG. 22 is a schematic diagram showing an information processing system 3 according to a modification example 2. FIG. 23 is a block diagram showing the hardware configuration of the information processing system 3 according to the modification example 2.

The information processing system 3 includes an HMD 100b, the input apparatus 200, and a personal digital assistant 400. In each of the embodiments described above, the CPU 103 provided to the HMDs 100 and 100a performs the main operation. On the other hand, in the information processing system 3 in this modification example, the personal digital assistant 400 separately provided from the HMD 100b performs the main process. This personal digital assistant 400 is exemplified by a smartphone, a portable game machine, and others.

The HMD 100b further includes a fifth transmitter/receiver 112 with exclusion of the first transmitter/receiver 108 and the second transmitter/receiver 109 from the hardware configuration of the HMD 100 in the first embodiment. The fifth transmitter/receiver 112 is a middle/low-speed short-range wireless transmitter/receiver such as Bluetooth (trade mark), and performs information exchange with the personal digital assistant 400. To be more specific, the fifth transmitter/receiver 112 executes a process of transmitting an image input signal of a real image obtained by the imaging section to the personal digital assistant 400, for example.

An input apparatus 200a further includes a sixth transmitter/receiver with exclusion of the third transmitter/receiver 208 from the hardware configuration of the input apparatus 200 in the first embodiment. The sixth transmitter/receiver 213 is a short-range wireless transmitter/receiver such as Bluetooth (trade mark) and infrared rays, and performs information exchange with the personal digital assistant 400. To be more specific, the sixth transmitter/receiver 213 executes a process of transmitting to the personal digital assistant 400 an operation input signal such as zoom operation input by a user to the input section, for example.

The HMD 100b does not include the first transmitter/receiver 108, and the input apparatus 200a does not include the third transmitter/receiver 208. Therefore, the HMD 100b and the input apparatus 200a do not directly perform information exchange, and the information exchange between the HMD 100b and the input apparatus 200a is performed via the personal digital assistant 400.

The personal digital assistant 400 includes a CPU 401, a memory 402, a display section 403, an input section 404, a seventh transmitter/receiver 405, an eighth transmitter/receiver 406, a ninth transmitter/receiver 408, and an internal power supply 407. The memory 402, the display section 403, the input section 404, the seventh transmitter/receiver 405, the eighth transmitter/receiver 406, and the ninth transmitter/receiver 408 are each connected to the CPU 401.

The CPU 401 follows a program stored in the memory 402 to execute various processes as the function sections described in each of the embodiments above.

The seventh transmitter/receiver 405 is a middle/low-speed short-range wireless transmitter/receiver such as Bluetooth (trade mark), and performs information exchange with the HMD 100b. To be more specific, the seventh transmitter/receiver 405 executes a process of transmitting an image output signal of virtual information to be displayed by the display section of the HMD 100b to the HMD 100b, for example.

The eighth transmitter/receiver 406 is a short-range wireless transmitter/receiver such as Bluetooth (trade mark) and infrared rays, and performs information exchange with the input apparatus 200a. To be more specific, the eighth transmitter/receiver 406 executes a process of transmitting a change signal to the input apparatus 200a to change the pattern of a graphic form as a marker projected by the input apparatus 200a, for example.

The ninth transmitter/receiver 408 is a high-speed middle-range wireless transmitter/receiver or a high-speed long-range wireless transmitter/receiver such as 3G (3rd Generation) and WiMAX (Worldwide Interoperability for Microwave Access, trade mark), and downloads contents to be displayed as the virtual information through connection to a network N such as the Internet and LAN (Local Area Network).

Note that the fifth transmitter/receiver 112 of the HMD 100b, and the seventh transmitter/receiver 405 of the personal digital assistant 400 may be each a cable transmitter/receiver.

Modification Example 3

Figure 24:
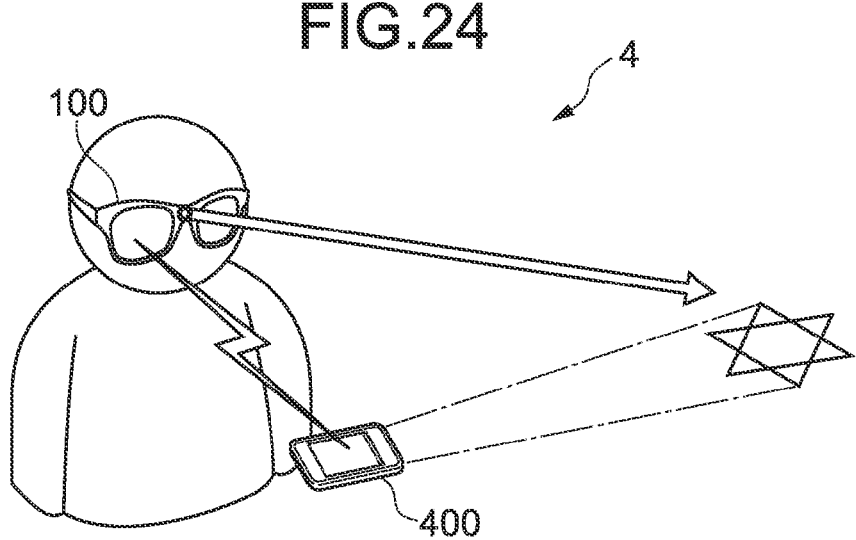
FIG. 24 is a schematic diagram showing an information processing system according to a modification example 3.

FIG. 24 is a schematic diagram showing an information processing system 4 according to a modification example 3.

The hardware configuration of the information processing system 4 in this modification example is similar to the hardware configuration (FIG. 3) of the information processing system 1 in the first embodiment.

In the embodiment described above, the CPU provided to the HMD executes the main process. On the other hand, in the information processing system 4 in this modification example, a personal digital assistant as the input apparatus 200 performs the main process. This personal digital assistant is exemplified by a smartphone, a portable game machine, and others.

The first transmitter/receiver 108 of the HMD 100 executes a process of transmitting an image input signal of a real image obtained by the imaging section 101 to the input apparatus (personal digital assistant) 200, for example.

The third transmitter/receiver 208 of the input apparatus (personal digital assistant) 200 performs a process of transmitting an image output signal of virtual information to be displayed by the display section 102 of the HMD 100 to the HMD 100, for example.

The CPU 212 of the input apparatus (personal digital assistant) 200 follows a program stored in the memory 205 to execute various processes as the function sections described in the embodiment above.

Note that when the display section 102 and the imaging section 101 are mounted in one apparatus (the HMD 100), the superimposition parameter correction (step S110) may be performed based on the relationship between the position of the HMD 100 and the position of the input apparatus 200.

Modification Example 4

Figure 25:
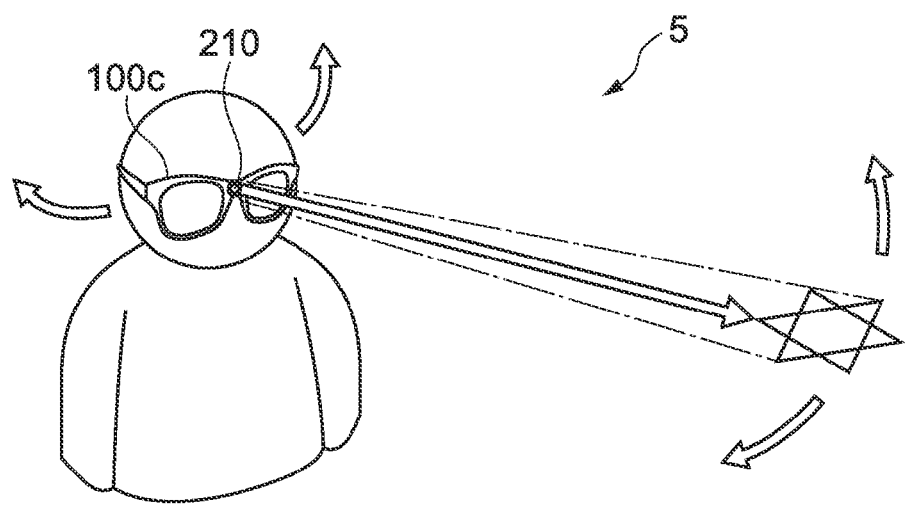
FIG. 25 is a schematic diagram showing an information processing system according to a modification example 4.
Figure 26:
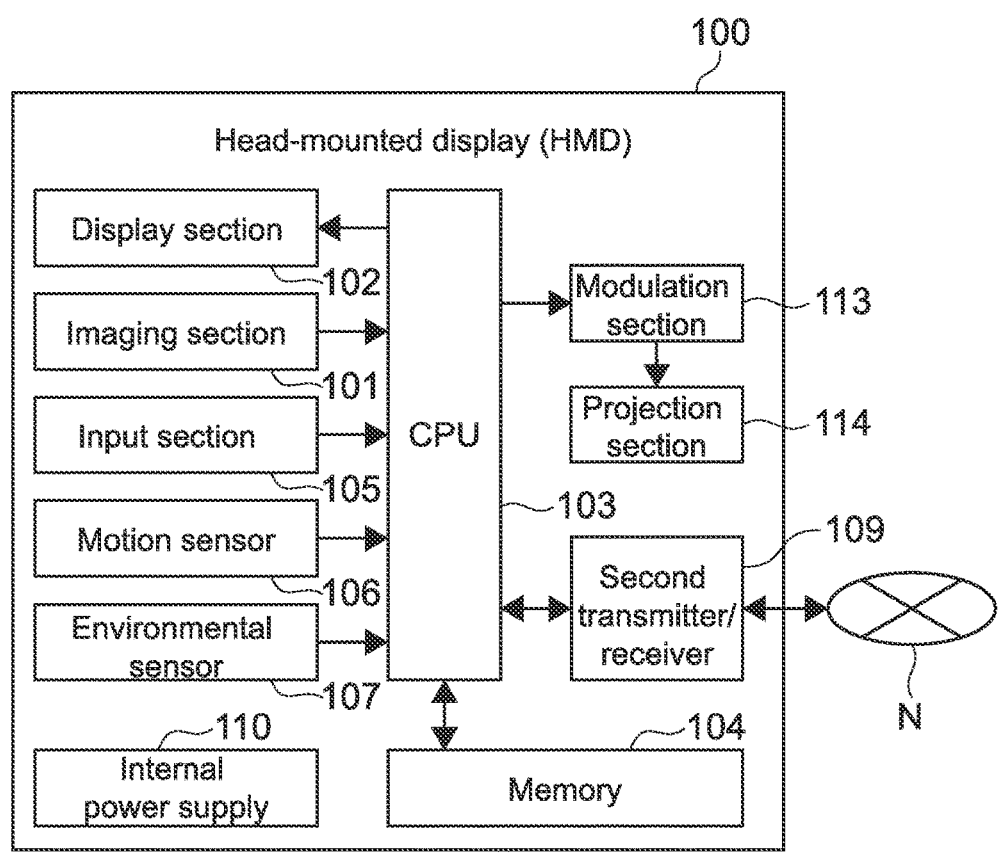
FIG. 26 is a block diagram showing the hardware configuration of the information processing system according to the modification example 4.

FIG. 25 is a schematic diagram showing an information processing system 5 according to a modification example 4. FIG. 26 is a block diagram showing the hardware configuration of the information processing system 5 according to the modification example 4.

In the embodiments described above, the input apparatus 200 separately provided from the HMD 100 is used to perform marker projection, and an input operation with respect to the virtual information. On the other hand, in this modification example, the input apparatus is not separately provided, and only an HMD 100c implements every operation including the marker projection and the input operation with respect to the virtual information.

The HMD 100c further includes a modulation section 113 connected to the CPU 103, and a projection section 114 connected to the modulation section 113 with exclusion of the first transmitter/receiver 108 from the hardware configuration of the HMD 100 in the first embodiment. The modulation section 113 and the projection section 114 have the functions similar to the functions of the modulation section 209 and those of the projection section 210, which are provided to the input apparatus 200 in the embodiments described above.

By moving the head wearing the HMD 100c, the user can operate the virtual information. As an example, when the user moves the projection position of a marker by moving his head up and down, and right and left, the display position for the virtual information to be displayed can be moved (dragged).

Modification Example 5

Figure 27:
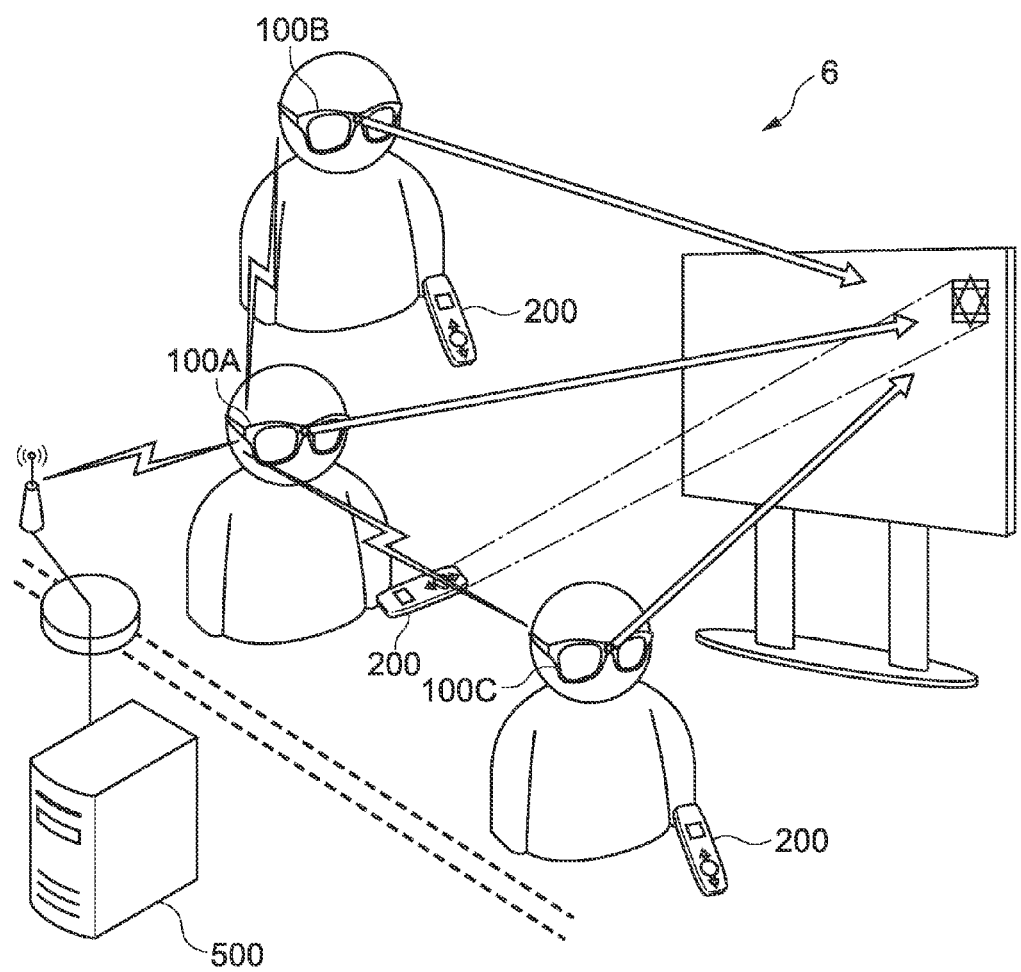
FIG. 27 is a schematic diagram showing an information processing system according to a modification example 5.

FIG. 27 is a schematic diagram showing an information processing system 6 according to a modification example 5.

The information processing system 6 includes a plurality of HMDs 100A, 1008, and 100C, a plurality of input apparatuses 200, and a server apparatus 500 storing content data of contents to be displayed as virtual information.

The projection HMD 100A obtains content data of contents to be displayed as virtual information through a search thereof in the server apparatus 500 via wireless or cable LAN (Local Area Network). The projection HMD 100A uses a short-range wireless transmitter/receiver (the fourth transmitter/receiver 111) to provide the no-projection HMDs 100B and 100C with the content data obtained from the server apparatus 500. In this manner, the projection HMD 100A and the no-projection HMDs 100B and 100C are each capable of displaying one specific content as virtual information.

Modification Example 6

Figure 28:
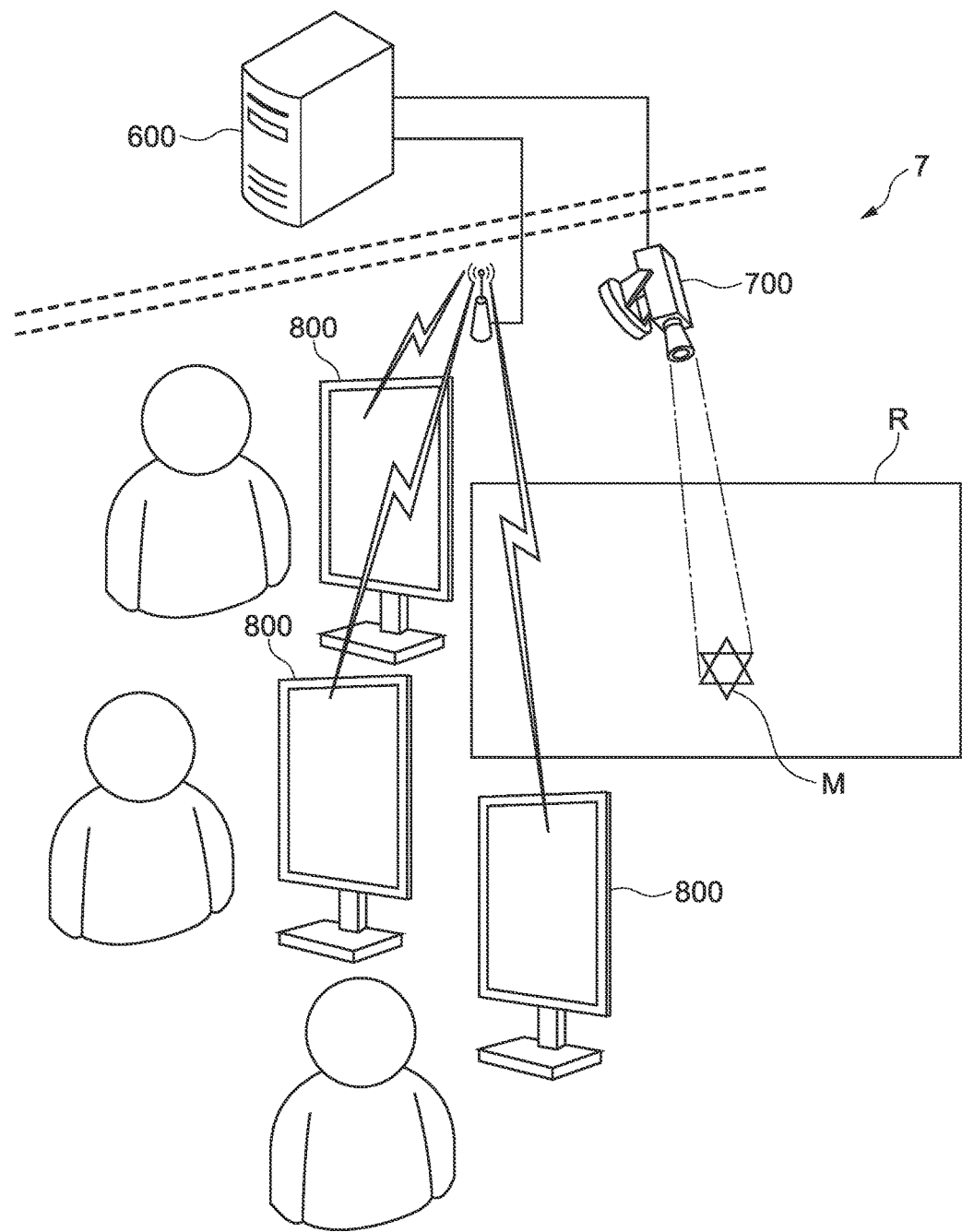
FIG. 28 is a schematic diagram showing an information processing system according to a modification example 6.

FIG. 28 is a schematic diagram showing an information processing system 7 according to a modification example 6.

The information processing system 7 includes a main processing apparatus 600, a projection/imaging apparatus 700, and one or more display apparatuses 800.

The main processing apparatus 600 issues a command about the shape of a marker M for projection, the position thereof in the real space R, or others to the projection/imaging apparatus 700 by short-range wireless or cable communication. Moreover, the main processing apparatus 600 obtains real image data from the projection/imaging apparatus 700, and calculates object image data of virtual information based on the obtained real image data. The main processing apparatus 600 generates display data by superimposing the calculated object image data on the real image data, and supplies the generated display data to a plurality of display apparatuses 800 by wireless communication.

The projection/imaging apparatus 700 projects the marker M toward the real space R, obtains the real image data by imaging of the real space R by a fixed point camera, and supplies the obtained real image data to the main processing apparatus 600.

The display apparatus 800 displays the display data provided by the main processing apparatus 600. The display apparatus 800 is an HUD (Head-Up Display), for example. Specifically, used as the HUD are a digital signage, a transparent display that can be disposed on a desk or a vehicle dashboard, a display of a personal digital assistant, and others.

Modification Example 7

Figure 29:
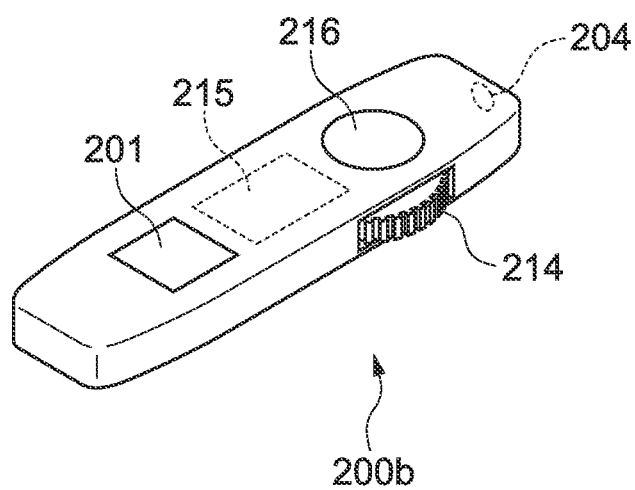
FIG. 29 is a perspective diagram showing an input apparatus according to a modification example 7.

FIG. 29 is a perspective view of an input apparatus 200b according to a modification example 7.

The input apparatus 200b includes a projection button 201, a wheel 214, a menu button 215, and a selection button 216, and has the function as a pointing device. The input apparatus 200b executes an input operation process as below with respect to an OS (Operating System).

(1) When the projection button 201 is operated, projection of a marker from the projection window 204 is started, and a pointer as virtual information is displayed.

(2) In the environment where a pointer as the virtual information is displayed on an icon or a window displayed as the virtual information, when the input apparatus 200b (pointing device) is moved, and when the selection button 216 is clicked, the icon is selected, or the button is clicked.

In the above environment, when the selection button 216 is double-clicked, an object is executed.

In the above environment, when the input apparatus 200b is moved while the selection button 216 is being depressed, the object is moved (dragged).

In the above environment, when the input apparatus 200b is rotated while the selection button 216 is being depressed, the object is rotated.

In the above environment, when the wheel 214 is rotated, the object is zoomed in/out, and the object is scrolled.

(3) When the selection button 216 is released after the drag/rotation operation of the object, the object as the virtual information remains displayed as is retained and fixed in position relative to the real space.

(4) When the menu button 215 is operated, a sub menu is displayed.

(5) When the projection button 201 is depressed during the projection of the marker, the projection of the marker is ended. After the projection of the marker is ended, the virtual information being displayed at the time point may remain displayed for a fixed length of time.

Modification Example 8

When the virtual information is continuously displayed even after the stopping of the marker projection and the superimposition parameter computing (Yes in step S106), the image data generation section 124 (first virtual information display control section) may stop the display of the virtual information by occurrence of a predetermined event. This "predetermined event" is exemplified as below.

An operation is performed on the input apparatus 200. As an example, when the input apparatus 200 is provided with a virtual information off button (not shown), the virtual information button is depressed.

A fixed length of time passes after the marker projection is stopped.

The imaging section 101 (the HMD 100) moves by a fixed distance or more.

The imaging section 101 (the HMD 100) rotates and moves by a fixed angle or more.

Modification Example 9

Figure 5:
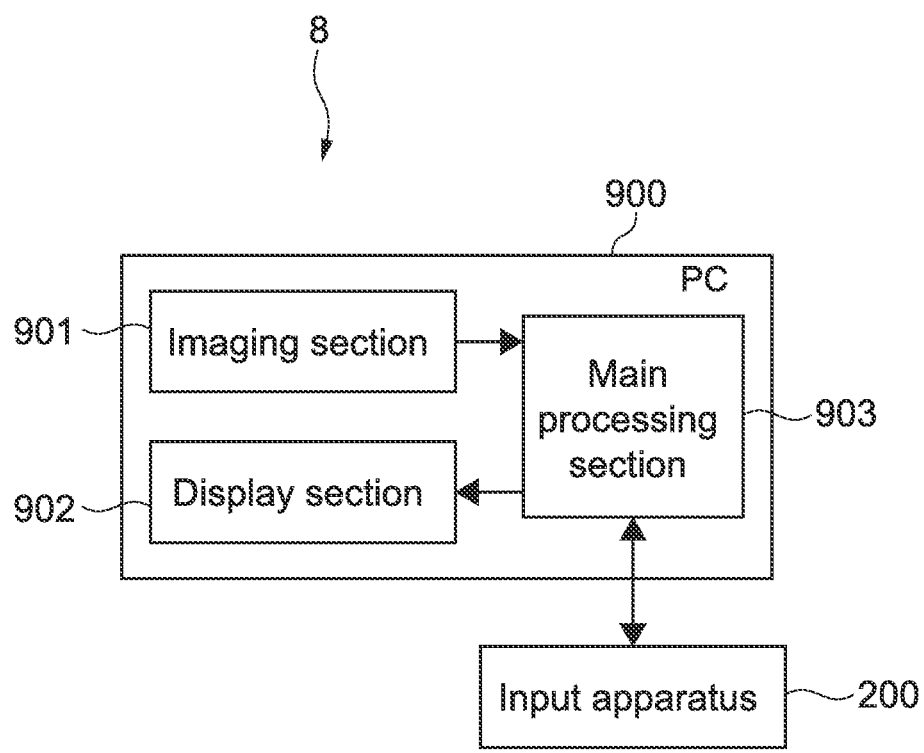
FIG. 5 is a block diagram schematically showing an information processing system according to a modification example 9.

FIG. 5 is a block diagram schematically showing an information processing system 8 according to a modification example 9.

The information processing system 8 includes the HMD 100, the input apparatus 200, and an information processing apparatus 900 (for example, personal computer (Personal Computer), hereinafter, referred to as PC) including an imaging section 901, a display section 902, and a main processing section 903. The input apparatus 200 is capable of projecting a marker in the real space. The imaging section 901 and the display section 902 are connected to the PC 900 or mounted thereon, and the display section 902 includes a display (a display 904 of FIG. 30).

Figure 30:
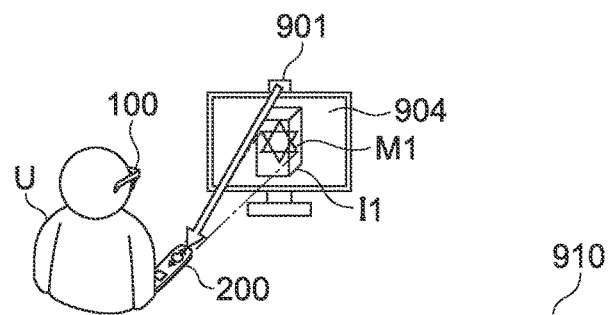
FIG. 30 is a diagram schematically showing a process to be realized by the modification example 9.

As shown in FIG. 30, a user U projects a marker M1 on the display 904 using the input apparatus 200. The imaging section 901 images a projection window of the input apparatus 200. The main processing section 903 calculates the projection position for the marker on the display 904 based on the angle, the distance, and others of the imaged projection window 204 with respect to the imaging section 901. The display section 902 displays virtual information 11 with respect to the marker M displayed on the display 904.

Figure 31:
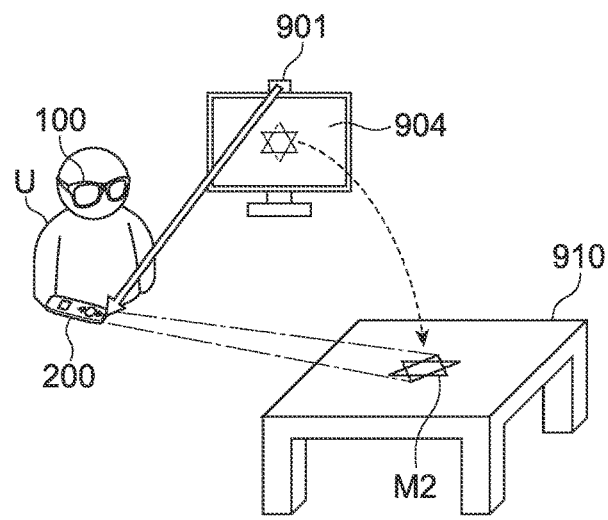
FIG. 31 is a diagram schematically showing a process to be realized by the modification example 9.

Thereafter, as shown in FIG. 31, the user U moves the input apparatus 200 to move the marker on the display 904 so that the virtual information is moved (dragged) on the display 904. The user U further moves the input apparatus 200 to move the marker on a projection target (desk, for example) away from the display 904 (a marker M2). The main processing section 903 of the PC 900 notifies the HMD 100 by wireless communication that the marker M2 is moved onto the projection target 910 by being away from the display 904.

Figure 32:
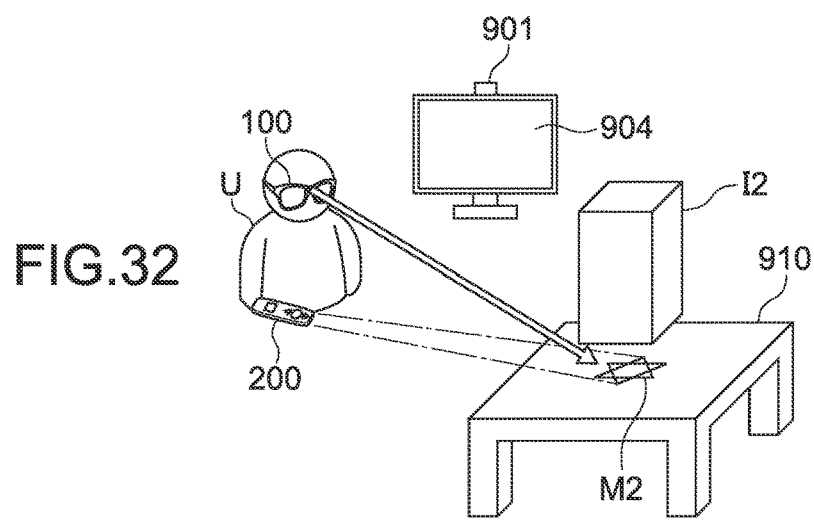
FIG. 32 is a diagram schematically showing a process to be realized by the modification example 9.

Upon reception of this notification, as shown in FIG. 32, the HMD 100 images the marker M2 projected on the projection target 910, thereby displaying virtual information 12.

Modification Example 10

The graphic form of a marker to be projected by the input apparatus may be any existing form. To be specific, the imaging section of the HMD images a marker existing in the real space. Alternatively, the HMD downloads any existing marker over the network. The HMD supplies the marker obtained by imaging or downloading to the input apparatus by wireless communication. Herein, the input apparatus is an apparatus such as a laser projector being capable of projecting an arbitrary graphic form. The input apparatus projects the marker obtained by the HMD into the real space.

Modification Example 11

As a light source for marker projection, a no-visible-range (infrared, ultraviolet, and others) laser may be used. This can prevent a user not wearing the HMD from perceiving the marker and the virtual information. On the other hand, a user wearing the HMD can perceive the virtual information. Moreover, by a process executed on the display section of the HMD to allow it to perceive the no-visible-range (infrared, ultraviolet, and others) laser, the user wearing the HMD may be allowed to perceive the marker.

Modification Example 12

In each of the embodiments described above, the user is assumed to be able to operate the virtual information using the input apparatus. Alternatively, the CPU of the HMD may change the position and angle of the virtual information by following a program stored in advance in the memory. In this case, a reference position for initially displaying the virtual information may be determined based on a marker projected by the display apparatus.

Modification Example 13

For correcting a superimposition parameter, the following approach may be also used. The area where a user can operate the input apparatus naturally is limited (for example, the area of a 50 cm square in front of the chest). On the other hand, in the case of the imaging section mounted on the HMD, the position relationship between the user and the imaging section is fixed to some degree. For that reason, the position relationship between the imaging section and the input apparatus is also fixed to some degree. By utilizing this, the first superimposition parameter of the virtual information calculated based on the marker imaged by the imaging section may be corrected so that the user can look more naturally. This approach is available even when the HMD is difficult to detect the position/orientation of the input apparatus with respect to the imaging section. Note that the present technology can also take the following structures.

(1)
An information processing apparatus comprising:
a processor configured to execute instructions to:
generate a superimposition parameter corresponding to superimposing virtual information on a real space based on a spatial position relationship of an imaging section and a marker projected on the real space by an input apparatus, and
cause a display section to display the virtual information superimposed on the real space according to the spatial position relationship while the marker is detectable and continue the display of the virtual information superimposed on the real space after the marker is undetectable according to an updated spatial position relationship based on a last detected position of the marker and a current position of the imaging section.

(2)
The information processing apparatus of (1), wherein a predetermined event causes the display of the virtual information superimposed on the real space after the marker is undetectable to stop.

(3)
The information processing apparatus of (2), wherein the predetermined event is at least one of a fixed length of time passing after the marker is undetectable, the imaging section moving at least a fixed distance, and the imaging section at least one of rotating and moving by at least a fixed angle.

(4)
The information processing apparatus of (1), wherein the information processing apparatus is a first head mounted display which includes the imaging section and the display section.

(5)
The information processing apparatus of (4), wherein a plurality of head mounted displays, including the first head mounted display, each display the virtual information superimposed on the real space based on the marker projected on the real space by the input apparatus.

(6)
The information processing apparatus of (1), wherein the processor is further configured to execute instructions to:
calculate a corrected marker;
transmit the corrected marker to the input apparatus, which projects the corrected marker on the real space; and
detect the corrected marker projected on the real space.

(7)
The information processing apparatus of (6), wherein a second superimposition parameter corresponding to superimposing the virtual information on the real space is generated based on a second spatial position relationship of a second imaging section and the corrected marker projected on the real space by the input apparatus.

(8)
The information processing apparatus of (1), wherein when a condition for an expected visual quality of the virtual information is not satisfied, the superposition parameter is corrected.

(9)
The information processing apparatus of (1), wherein the input apparatus is at least one of a personal digital assistant, a smartphone, a portable game machine.

(10)
The information processing apparatus of (1), wherein the input apparatus includes a projection button.

(11)
The information processing apparatus of (1), wherein the input apparatus includes a zoom operation input.

(12)
An information processing apparatus comprising:
a receiver; and
a processor configured to execute instructions to:
receive a superimposition parameter corresponding to superimposing virtual information on a real space based on a spatial position relationship of an imaging section and a marker projected on the real space by an input apparatus, and
cause a display section to display the virtual information superimposed on the real space according to the spatial position relationship while the marker is detectable and continue the display of the virtual information superimposed on the real space after the marker is undetectable according to an updated spatial position relationship based on a last detected position of the marker and a current position of the imaging section.

(13)
A system comprising:
a first information processing apparatus, comprising:
a first processor configured to execute instructions to generate a superimposition parameter corresponding to superimposing virtual information on a real space based on a spatial position relationship of an imaging section and a marker projected on the real space by an input apparatus; and
a second information processing apparatus, comprising:
a second processor configured to execute instructions to cause a display section to display the virtual information superimposed on the real space according to the spatial position relationship while the marker is detectable and continue the display of the virtual information superimposed on the real space after the marker is undetectable according to an updated spatial position relationship based on a last detected position of the marker and a current position of the imaging section.

(14)
An information processing apparatus, comprising:
an imaging section configured to obtain a real image by imaging of a real scenery;
a graphic form detection section configured to detect, from the real image, an image of a graphic form projected by a projection apparatus on the real scenery;
a characteristic point detection section configured to detect, in real time, a characteristic point from the real image of the real scenery; and
a parameter generation section configured to generate a parameter necessary to cause a display section to display virtual information with superimposition on the real scenery based on a first position relationship between the graphic form and the imaging section, and when the graphic form disappears from the real image, generate the parameter based on a detection result by the characteristic point detection section to continuously display the virtual information while retaining a second position relationship with the real scenery at a time point when the graphic form is detected last.

(15)
The information processing apparatus according to (14), further comprising a first virtual information display control section configured to stop display of the virtual information using the parameter generated based on the detection result by the characteristic point detection section due to occurrence of a predetermined event.

(16)
The information processing apparatus according to (15), further comprising:
an angle obtaining section configured to obtain an angle between an optical axis of the image projected by the projection apparatus and a projection target surface in the real scenery; and
a distortion creation section configured to create distortion to the graphic form projected by the projection apparatus based on the obtained angle to make the graphic form projected by the projection apparatus on the projection target surface to be in a predetermined reference shape.

(17)
The information processing apparatus according to (16), wherein
the parameter generation section is configured to generate the parameter based on the first position relationship between the distortion-created graphic form and the imaging section.

(18)
The information processing apparatus according to (17), further comprising a second virtual information display control section configured to
determine, by following a predetermined rule, at least one of whether or not a content of the virtual information is against a natural law when the virtual information is displayed with superimposition on the real scenery and whether or not a condition for an expected visual quality is satisfied, and
in at least one of cases where the content is against the natural law and where the condition is not satisfied, cancel the display of the virtual information.

(19)
The information processing apparatus according to (17), further comprising a second virtual information display control section configured to
determine, by following a predetermined rule, at least one of whether or not a content of the virtual information is against a natural law when the virtual information is displayed with superimposition on the real scenery and whether or not a condition for an expected visual quality is satisfied, and
in at least one of cases where the content is against the natural law and where the condition is not satisfied, change a display position of the virtual information to satisfy at least one of the natural law and the condition for the visual quality.

(20)
The information processing apparatus according to (14), further comprising the display section.

(21)
The information processing apparatus according to (14), further comprising the projection apparatus.

(22)
An information processing system, comprising:
a first information processing apparatus including
a first imaging section configured to obtain a first real image by imaging of a first real scenery,
a first graphic form detection section configured to detect, from the first real image, an image of a graphic form projected by a projection apparatus on the real scenery,
a characteristic point detection section configured to detect, in real time, a characteristic point from the first real image of the real scenery,
a first parameter generation section configured to generate a first parameter necessary to cause a first display section to display virtual information with superimposition on the real scenery based on a first position relationship between the graphic form and the first imaging section, and when the graphic form disappears from the first real image, generate the first parameter based on a detection result by the characteristic point detection section to continuously display the virtual information while retaining a second position relationship with the real scenery at a time point when the graphic form is detected last, an angle obtaining section configured to obtain an angle between an optical axis of the image projected by the projection apparatus and a projection target surface in the real scenery, and a distortion creation section configured to create distortion to the graphic form projected by the projection apparatus based on the obtained angle to make the graphic form projected by the projection apparatus on the projection target surface to be in a predetermined reference shape, the first parameter generation section being configured to generate the parameter based on the first position relationship between the distortion-created graphic form and the first imaging section; and a second information processing apparatus including a second imaging section configured to obtain a second real image by imaging of the first real scenery, a second graphic form detection section configured to detect, from the second real image, an image of the distortion-created graphic form projected by the projection apparatus on the first real scenery, and a second parameter generation section configured to generate a second parameter necessary to cause a second display section to display the virtual information with superimposition on the real scenery based on a third position relationship between the distortion-created graphic form and the second imaging section.

(23)

An information processing system, comprising:

a first information processing apparatus including a first imaging section configured to obtain a first real image by imaging of a first real scenery, a first graphic form detection section configured to detect, from the first real image, an image of a graphic form projected by a projection apparatus on the real scenery, a characteristic point detection section configured to detect, in real time, a characteristic point from the first real image of the real scenery, a first parameter generation section configured to generate a first parameter necessary to cause a first display section to display virtual information with superimposition on the real scenery based on a first position relationship between the graphic form and the first imaging section, and when the graphic form disappears from the first real image, generate the first parameter based on a detection result by the characteristic point detection section to continuously display the virtual information while retaining a second position relationship with the real scenery at a time point when the graphic form is detected last, an angle obtaining section configured to obtain an angle between an optical axis of the image projected by the projection apparatus and a projection target surface in the real scenery, and a transmission section configured to transmit the first parameter to a second information processing apparatus; and the second information processing apparatus including a second imaging section configured to obtain a second real image by imaging of the first real scenery, a second graphic form detection section configured to detect, from the second real image, the image of the graphic form projected by the projection apparatus on the first real scenery, a second parameter generation section configured to generate a second parameter necessary to cause a second display section to display the virtual information with superimposition on the real scenery based on a third position relationship between the graphic form and the second imaging section, and a correction section configured to receive the first parameter from the first information processing apparatus, and correct the second parameter using the received first parameter.

(24)

An information processing method, comprising:

obtaining, by an imaging section, a real image by imaging of a real scenery;

detecting, by a graphic form detection section, from the real image, an image of a graphic form projected by a projection apparatus on the real scenery;

detecting, by a characteristic point detection section, in real time, a characteristic point from the real image of the real scenery; and generating, by a parameter generation section, a parameter necessary to cause a display section to display virtual information with superimposition on the real scenery based on a first position relationship between the graphic form and the imaging section, and when the graphic form disappears from the real image, generating the parameter based on a detection result by the characteristic point detection section to continuously display the virtual information while retaining a second position relationship with the real scenery at a time point when the graphic form is detected last.]

The present application contains subject matter related to that disclosed in Japanese Priority Patent Application JP 2012-076966 filed in the Japan Patent Office on Mar. 29, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 HMD
101 imaging section
102 display section
120 three-dimensional configuration estimation section
121 marker detection section
122 superimposition parameter generation section
124 image data generation section
200 input apparatus

The invention claimed is:

1. A first information processing apparatus, comprising:
a processor configured to:
detect a real object on a real space;
receive first superimposition information from a second information processing apparatus, wherein the first superimposition information corresponds to superimposition of a virtual object on the real object, and wherein the first superimposition information is based on a spatial position relationship of the second information processing apparatus and the real object;

generate second superimposition information based on spatial positional information of the first information processing apparatus and the received first superimposition information;

receive corrected information that corresponds to the real object, wherein the received corrected information is based on a determination that a first visibility of the real object is lower than a second visibility of the real object, wherein the first visibility corresponds to the first information processing apparatus and the second visibility corresponds to the second information processing apparatus; and display the virtual object based on the generated second superimposition information and the received corrected information.

2. The first information processing apparatus of claim 1, wherein the real object is a marker.

3. The first information processing apparatus of claim 1, wherein the real object is a projected marker.

4. The first information processing apparatus of claim 1, wherein the first information processing apparatus is a head mounted device (HMD).

5. The first information processing apparatus of claim 1, wherein the first superimposition information is generated by the second information processing apparatus.

6. The first information processing apparatus of claim 1, wherein the spatial positional information of the first information processing apparatus includes an angle and a distance between the real object and the first information processing apparatus.

7. The first information processing apparatus of claim 1, wherein the first visibility includes a degree of distortion of the real object.

8. The first information processing apparatus of claim 1, wherein the corrected information includes corrected marker information.

9. The first information processing apparatus of claim 1, wherein based on the real object that is undetectable, an event controls the display of the virtual object superimposed on the real space to stop.

10. The first information processing apparatus of claim 9, wherein the event is at least one of a fixed length of time elapsed after the real object is undetectable, movement of an image sensor coupled with the first information processing apparatus, a fixed distance, or movement of the image sensor, wherein the movement of the image sensor is at least one of rotation or movement by at least a fixed angle.

11. The first information processing apparatus of claim 1, wherein the first information processing apparatus is a head mounted display, and wherein the head mounted display further includes a display screen.

12. The first information processing apparatus of claim 1, wherein the processor is further configured to receive the first superimposition information from the second information processing apparatus.

13. The first information processing apparatus of claim 1, wherein the processor is further configured to calculate a coordinate system of the real object.

14. The first information processing apparatus of claim 1, wherein the processor is further configured to convert a first coordinate system of the virtual object into a second coordinate system based on a second superimposition parameter, and wherein the second coordinate system is associated with a three-dimensional configuration of the real space.

15. An information processing method, comprising:

in a first information processing apparatus:

detecting a real object on a real space;

receiving first superimposition information from a second information processing apparatus, wherein the first superimposition information corresponds to superimposition of a virtual object on the real object, and wherein the first superimposition information is based on a spatial position relationship of the second information processing apparatus and the real object;

generating second superimposition information based on spatial positional information of the first information processing apparatus and the received first superimposition information;

receiving corrected information that corresponds to the real object, wherein the received corrected information is based on a determination that a first visibility of the real object is lower than a second visibility of the real object, wherein the first visibility corresponds to the first information processing apparatus and the second visibility corresponds to the second information processing apparatus; and displaying the virtual object based on the generated second superimposition information and the received corrected information.

16. A non-transitory computer-readable medium having stored thereon, computer-executable instructions, that when executed by a computer, cause the computer to execute operations, the operations comprising:

detecting, by a first information processing apparatus, a real object on a real space;

receiving, by the first information processing apparatus, first superimposition information from a second information processing apparatus, wherein the first superimposition information corresponds to superimposition of a virtual object on the real object, and wherein the first superimposition information is based on a spatial position relationship of the second information processing apparatus and the real object;

generating, by the first information processing apparatus, second superimposition information based on spatial positional information of the first information processing apparatus and the received first superimposition information;

receiving corrected information that corresponds to the real object, wherein the received corrected information is based on a determination that a first visibility of the real object is lower than a second visibility of the real object, wherein the first visibility corresponds to the first information processing apparatus and the second visibility corresponds to the second information processing apparatus; and displaying, by the first information processing apparatus, the virtual object based on the generated second superimposition information and the received corrected information.

* * * * *